(12) United States Patent
Inami et al.

(10) Patent No.: US 9,891,623 B2
(45) Date of Patent: Feb. 13, 2018

(54) AUTOMATED DRIVING SYSTEM OF VEHICLE

(71) Applicant: TOYOTA JIDOSHA KABUSHIKI KAISHA, Toyota-shi, Aichi-ken (JP)

(72) Inventors: Norio Inami, Susono (JP); Yusuke Hoki, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/138,528

(22) Filed: Apr. 26, 2016

(65) Prior Publication Data
US 2016/0320776 A1 Nov. 3, 2016

(30) Foreign Application Priority Data
Apr. 30, 2015 (JP) .................................. 2015-093411

(51) Int. Cl.
*G05D 1/00* (2006.01)
*F01P 7/16* (2006.01)
(Continued)

(52) U.S. Cl.
CPC .............. *G05D 1/0088* (2013.01); *F01P 7/16* (2013.01); *F02D 23/02* (2013.01); *F02D 41/00* (2013.01); *F02D 41/005* (2013.01); *F02D 41/021* (2013.01); *G01C 21/34* (2013.01); *F02D 41/0007* (2013.01); *F02D 2041/1412* (2013.01); *F02D 2200/021* (2013.01); *F02D 2200/0406* (2013.01); *F02D 2200/701* (2013.01); *F02D 2200/702* (2013.01); *F02D 2250/21* (2013.01); *F02D 2250/22* (2013.01); *Y02T 10/47* (2013.01)

(58) Field of Classification Search
CPC ......... G05D 1/008; G05D 1/0088; F01P 7/16; F02D 23/02; F02D 41/00; F02D 41/005; F02D 41/021

USPC .......................................................... 701/25
See application file for complete search history.

(56) References Cited

U.S. PATENT DOCUMENTS 5,832,400 A * 11/1998 Takahashi .............. B60K 31/00
701/53
2016/0195407 A1 7/2016 Sasaki

FOREIGN PATENT DOCUMENTS

JP H08-72591 A 3/1996
JP 2003-328756 A 11/2003
(Continued)

OTHER PUBLICATIONS

EPO english translation of JP 2008106653 A.*
WIPO english translation of WO 2013094019 A1.*

*Primary Examiner* — Yazan Soofi
(74) *Attorney, Agent, or Firm* — Andrews Kurth Kenyon LLP

(57) ABSTRACT

A driving plan of the vehicle is generated based on the map information and the information on the surroundings of the vehicle detected by a detection sensor, and an automated driving operation of the vehicle is controlled based on this driving plan. When a change in the operating state of the engine is predicted from the driving plan, an advanced control of the control command value of the engine operation control device where the control command value of the engine operation control device is made to change is started in advance of the predicted change of the operating state of the engine. When there is a demand for sudden stop of the vehicle contrary to the driving plan of the vehicle, this advanced control is stopped.

15 Claims, 21 Drawing Sheets

(51) Int. Cl.
*F02D 23/02* (2006.01)
*F02D 41/00* (2006.01)
*F02D 41/02* (2006.01)
*G01C 21/34* (2006.01)
*F02D 41/14* (2006.01)

(56) References Cited

FOREIGN PATENT DOCUMENTS

| | | | |
|---|---|---|---|
| JP | 2004-218440 A | | 8/2004 |
| JP | 2007-071116 A | | 3/2007 |
| JP | 2008106653 A | * | 5/2008 |
| JP | 4591435 B2 | | 12/2010 |
| JP | 2011-240816 A | | 12/2011 |
| JP | WO 2013094019 A1 | * | 6/2013 ......... F02D 41/0007 |
| WO | 2015/029181 A1 | | 3/2015 |

* cited by examiner

FIG. 7A
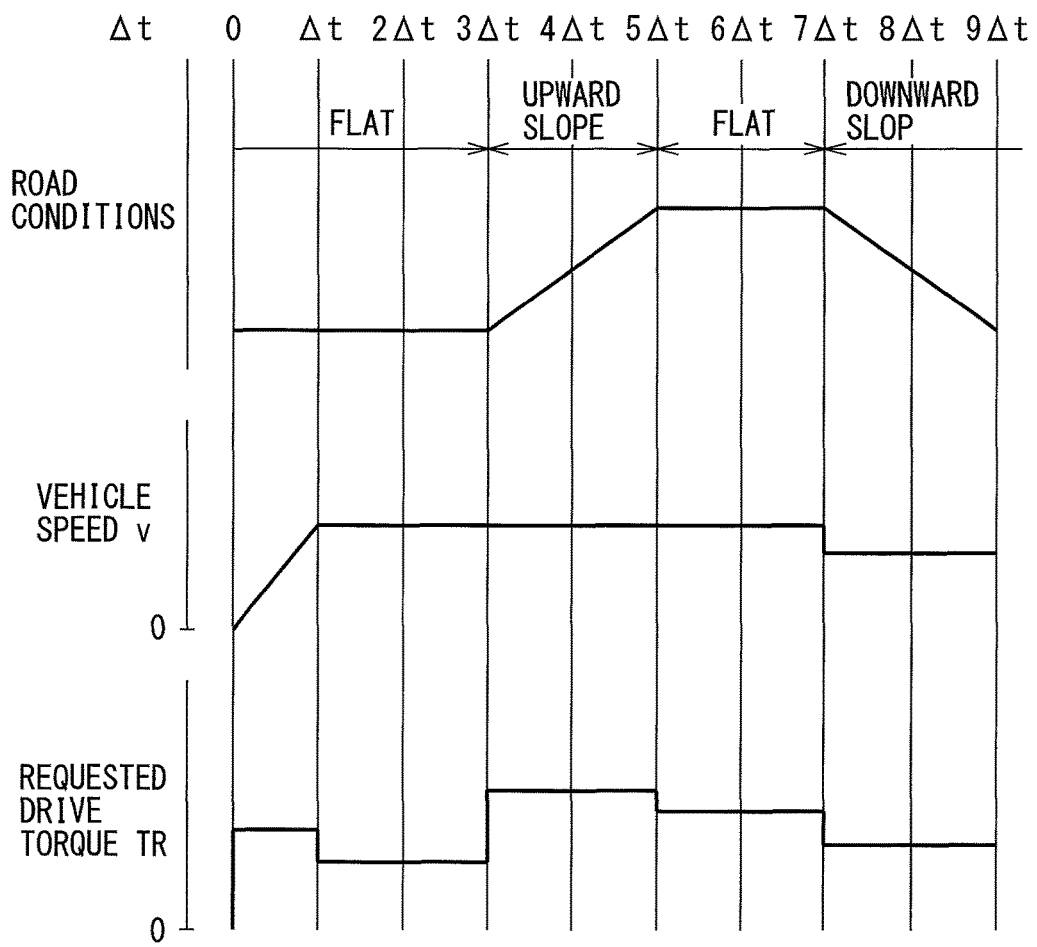
FIG. 7B
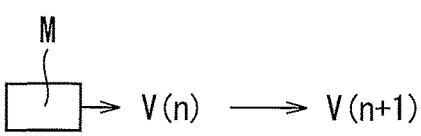
FIG. 7C
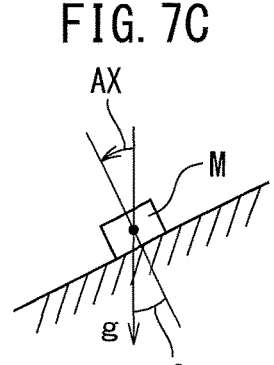

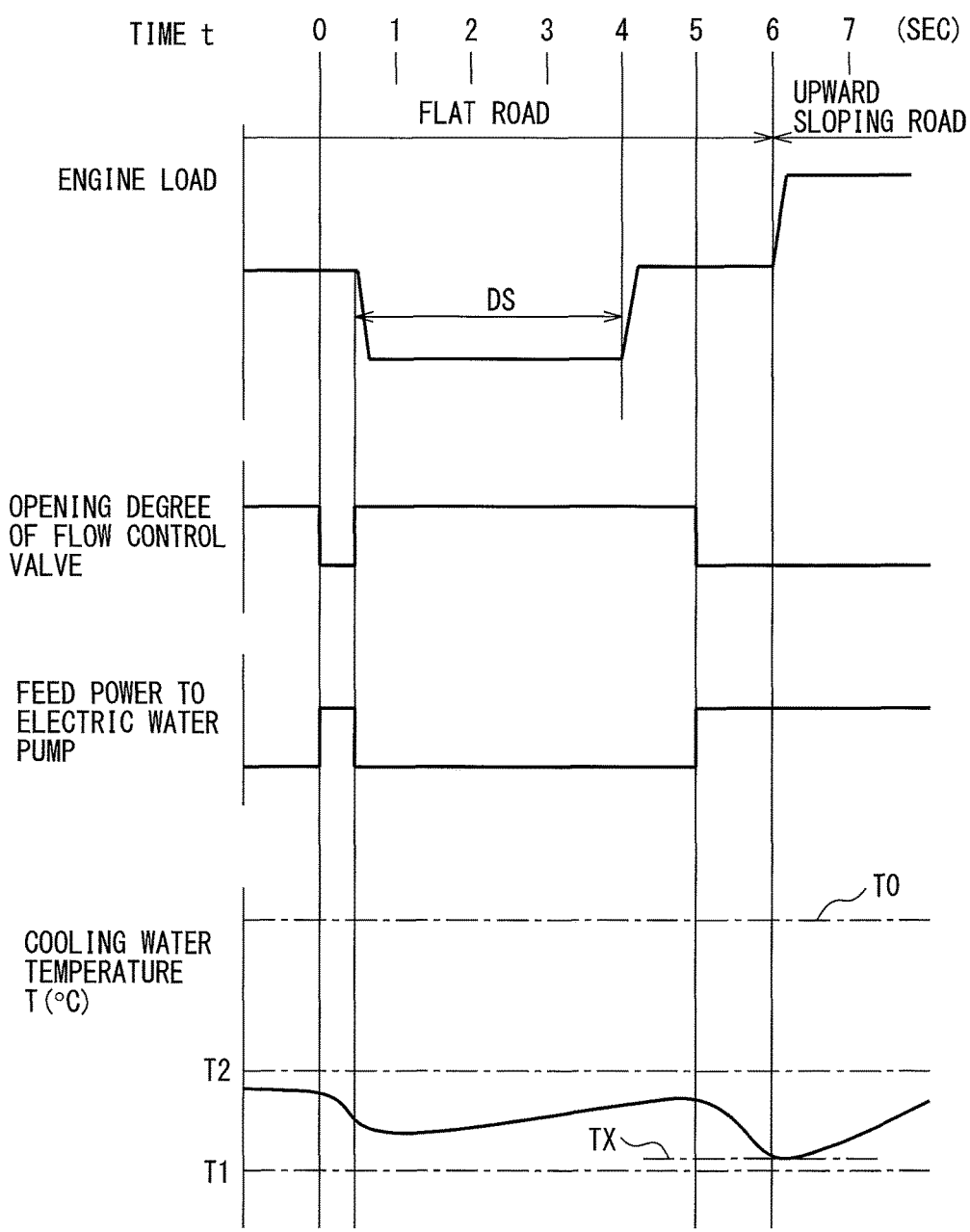

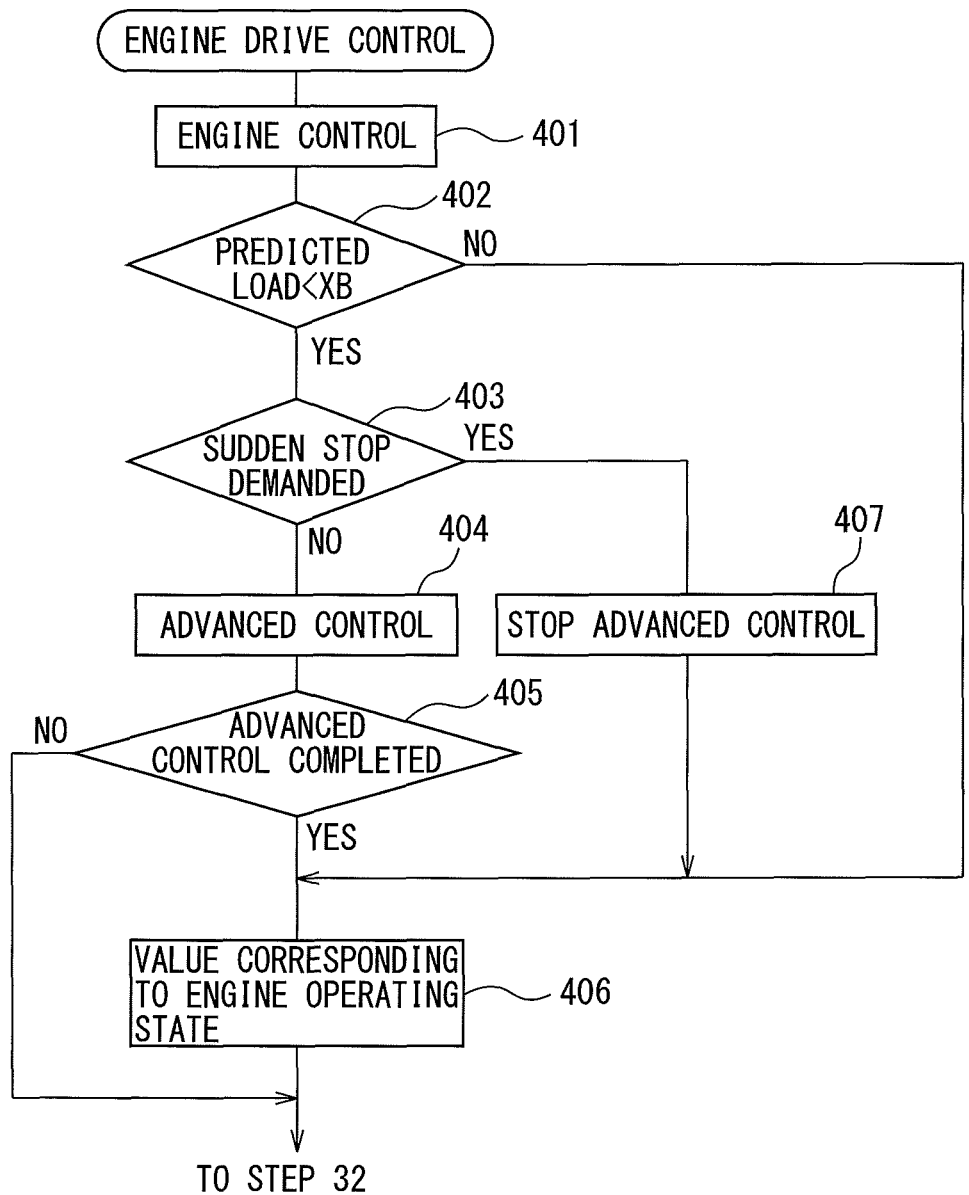

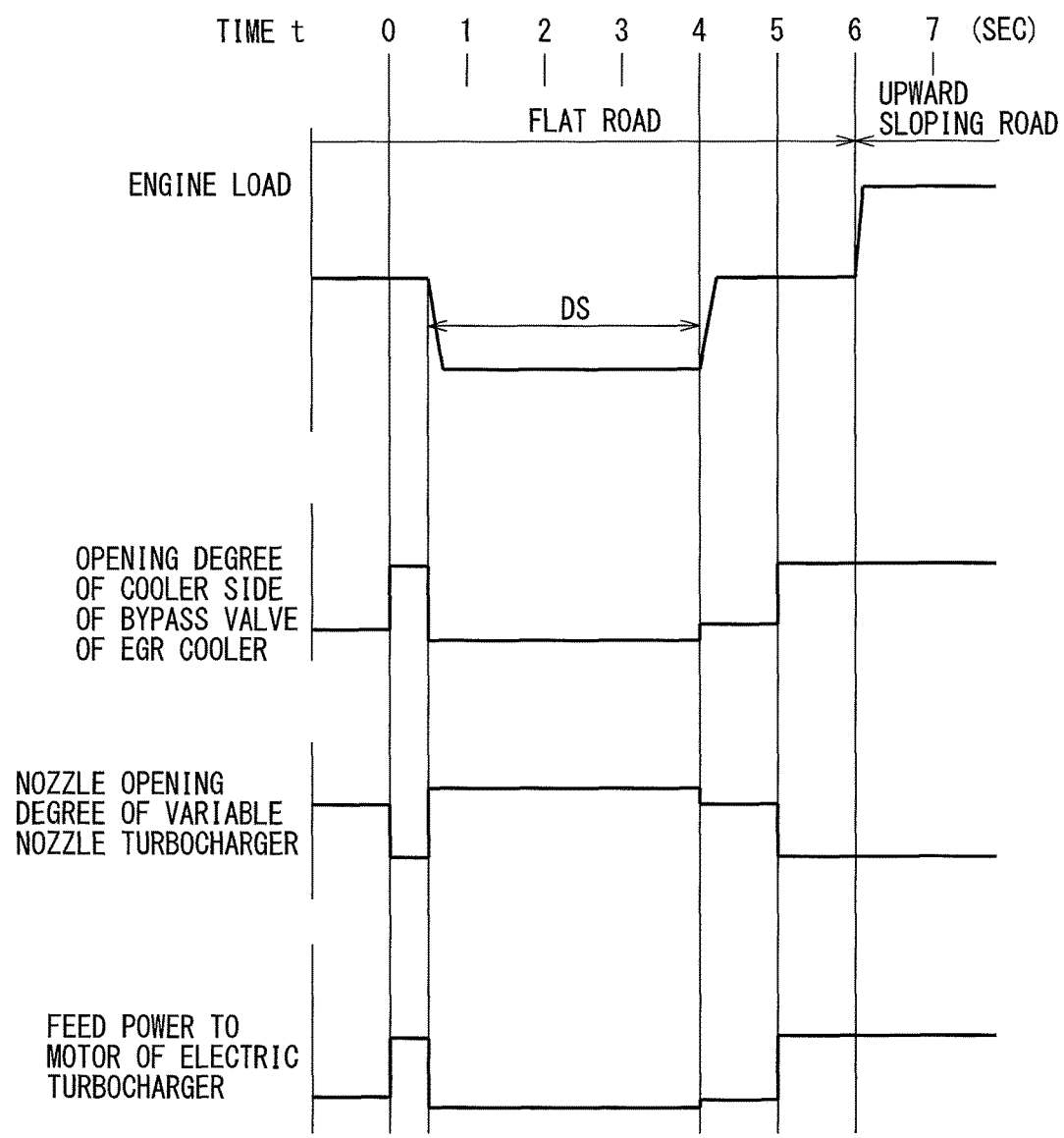

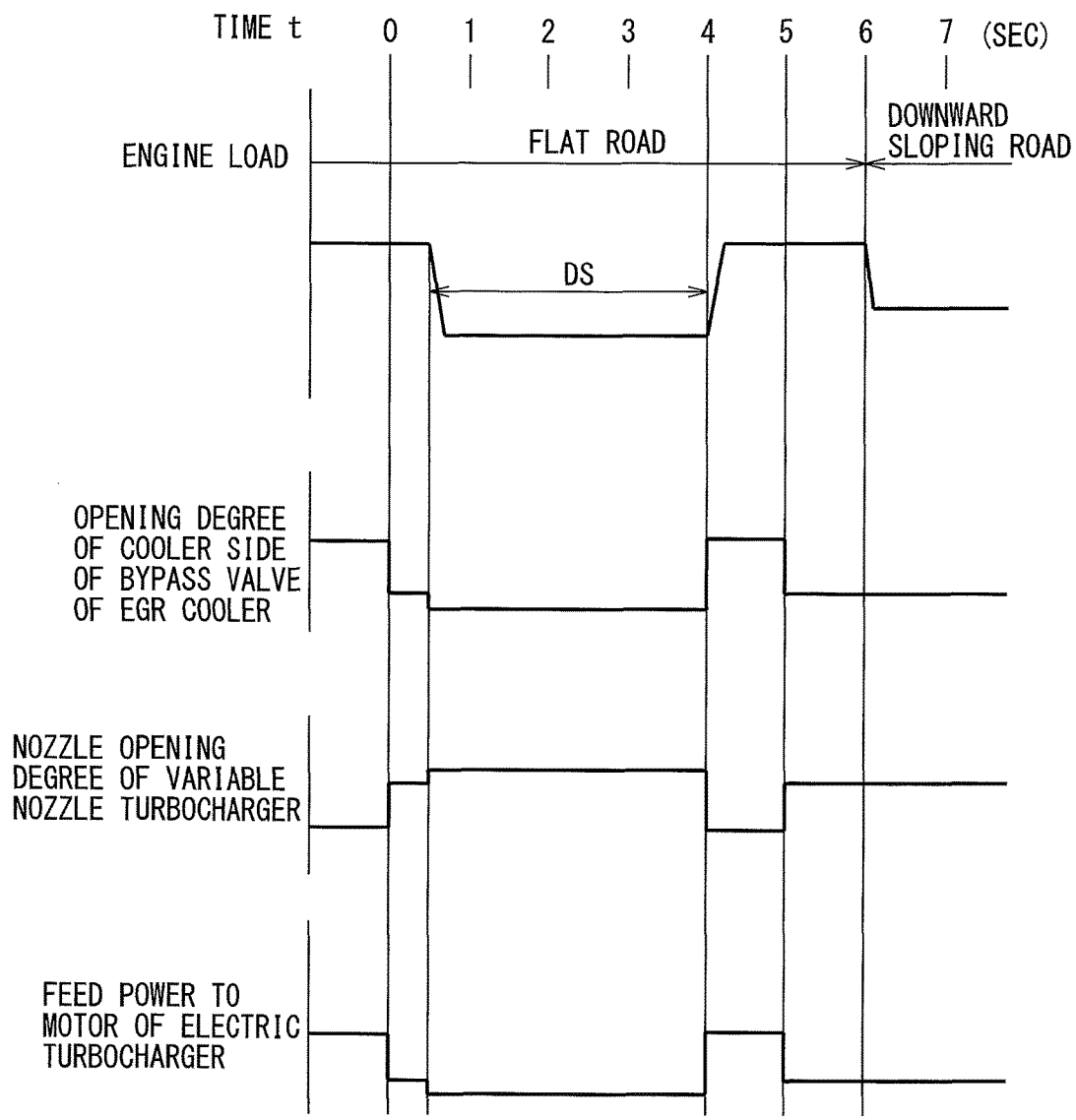

AUTOMATED DRIVING SYSTEM OF VEHICLE

CROSS-REFERENCE TO RELATED APPLICATION

This application claims priority based on Japanese Patent Application No. 2015-093411 filed with the Japan Patent Office on Apr. 30, 2015, the entire contents of which are incorporated into the present specification by reference.

TECHNICAL FIELD

Embodiments of the present invention relates to an automated driving system of a vehicle.

BACKGROUND ART

Knocking in an internal combustion engine easily occurs at the time of a high load and low speed operation. Therefore, for example, knocking easily occurs when an accelerator pedal is depressed to climb a sloping road, that is, when the engine load shifts from a low load to a high load in the state of a low engine speed. In this case, if cooling intake air which is fed to the engine, the occurrence of knocking can be suppressed. Therefore, an internal combustion engine is known in the art which is provided with a cooling device for cooling the intake air fed to the engine and is designed so that when for example the engine load starts to increase, the cooling action of the intake air fed to the engine is strengthened.

However, even if strengthening the cooling action of the intake air fed to the engine, time is required until the cooling action of the intake air is actually strengthened. Therefore, even if strengthening the cooling action of the intake air fed to the engine when the engine load starts to increase, it is difficult to suppress the occurrence of knocking. That is, to suppress the occurrence of knocking, it is necessary to start to strengthen the cooling of the intake air fed to the engine before the engine load is increased.

Therefore, a vehicle is known in the art in which a car navigation system which utilizes GPS (global positioning system) is provided. Road information including a scheduled driving route to a destination and a road slope etc. on this scheduled driving route are detected by this car navigation system. A time period during which the engine load will be increased is detected from this information, and the cooling action of the intake air fed to the engine is strengthened before the engine load is increased (for example, see Japanese Patent No. 4591435).

SUMMARY

Technical Problem

However, in this vehicle, movement of pedestrians in the surroundings of the vehicle and other information on the surroundings of the vehicle are not always detected, so a pedestrian suddenly jumping out in front of the vehicle cannot be detected. Therefore, when the cooling action of the intake air starts to be strengthened, even if, for example, a pedestrian suddenly jumps out and causes the vehicle to be rapidly stopped, the cooling action of the intake air fed to the engine is maintained as strengthened. As a result, problems arise that the intake air is excessively cooled, the combustion becomes unstable, and the heat efficiency of the engine falls.

Embodiments of the present invention provide an automated driving system of a vehicle which can secure good engine operation even if there is a demand for a sudden stop of the vehicle such as when a pedestrian suddenly jumps out in front of the vehicle.

Solution to Problem

That is, according to embodiments of the present invention, there is provided an automated driving system of a vehicle including a detection sensor for detecting information on surroundings of the vehicle and, an electronic control unit configured to generate a driving plan for the vehicle along a predetermined target route based on map information and the information of the surroundings of the vehicle detected by the detection sensor and control an automated driving of the vehicle based on the generated driving plan for the vehicle. The electronic control unit is configured to start an advanced control of a control command value of an engine operation control device, where the control command value of the engine operation control device is made to change in a direction which is based on and prior to a predicted operating state of the engine in advance of the predicted change of the operating state of the engine, the operating state of the engine is predicted from the driving plan. The electronic control unit is configured to stop the advanced control of a control command value when there is a demand for sudden stop of the vehicle contrary to the driving plan of the vehicle along the predetermined target route based on the information on the surroundings of the vehicle detected by the detection sensor.

Advantageous Effects of Embodiments of the Present Invention

It is possible to maintain the operating state of the engine at the optimum operating state by stopping the advanced control of a control command value of the engine operation control device when there is a demand for sudden stop of the vehicle.

BRIEF DESCRIPTION OF DRAWINGS

FIGS. 7A, 7B, and 7C are views for explaining a change of a required drive torque TR to a vehicle V and a method of calculation of this required drive torque TR.

FIG. 15 is a time chart of control of a cooling water temperature of the engine according to the present invention.

FIG. 24 is a flow chart for control of the drive operation of the engine.

FIG. 25 is a time chart of control for cooling the EGR cooler of an engine etc. according to an embodiment of the present invention.

FIG. 26 is a time chart of control for cooling the EGR cooler of an engine etc. according to an embodiment of the present invention.

DESCRIPTION OF EMBODIMENTS

Figure 1:
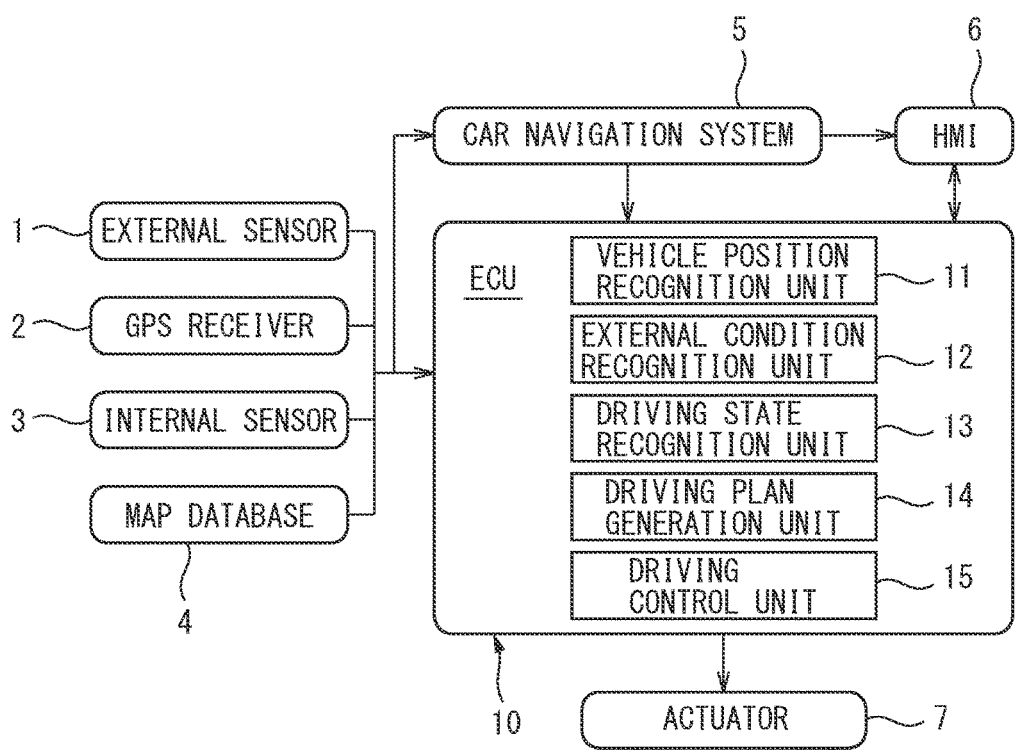
FIG. 1 is a block diagram which shows the configuration of an automated driving system of a vehicle.

FIG. 1 is a block diagram which shows the configuration of an automated driving system of a vehicle which is mounted in an automobile or other vehicle. Referring to FIG. 1, this automated driving system of a vehicle is provided with an external sensor 1 for detecting information on the surroundings of the vehicle, a GPS (global positioning system) receive unit 2, an internal sensor 3, a map database 4, a car navigation system 5, various actuators 6, a HMI (human-machine interface) 7, and an electronic control unit (ECU) 10.

Figure 2:
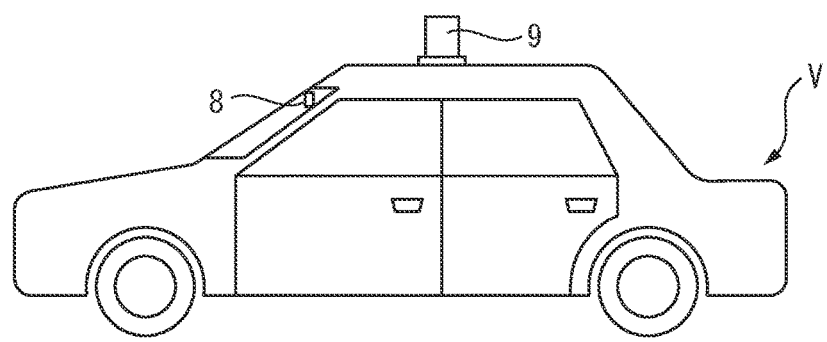
FIG. 2 is a side view of a vehicle.

In FIG. 1, the external sensor 1 is a detection device for detecting information on the surroundings of a vehicle V, that is, the external conditions. This external sensor 1 includes at least one of a camera, radar, and LIDER (laser imaging detection and ranging device). The camera, for example, as shown in FIG. 2 by reference notation 8, is provided at a back side of a windshield of the vehicle V, and a view of the road in front of the vehicle V is captured by this camera 8. The captured information of this camera 8 is transmitted to the electronic control unit 10. On the other hand, the radar is a device which uses radio waves to detect external obstacles to the vehicle V. This radar uses the reflected waves from the radio waves which the radar emitted to the surroundings of the vehicle V to detect any obstacles in the surroundings of the vehicle V. The obstacle information which is detected from the radar is transmitted to the electronic control unit 10.

LIDER is a device which uses laser beams to detect external obstacles to the vehicle V. This LIDER, for example, as shown in FIG. 2 by reference notation 9, is installed on a roof of the vehicle V. This LIDER 9 uses the reflected light from the laser beams which the LIDER 9 successively fires toward the overall surroundings of the vehicle V to measure the distances to any obstacles and detects the presence of any obstacles in the overall surroundings of the vehicle V in the form of three-dimensional shapes. The three-dimensional obstacle information which is detected from this LIDER 9 is transmitted to the ECU 10.

In FIG. 1, in the GPS receive unit 2, signals from three or more GPS satellites are received. Due to this, the position of the vehicle V (for example, a latitude and longitude of the vehicle V) is detected. The position information of the vehicle which is detected by the GPS receiver 2 is transmitted to the electronic control unit 10.

In FIG. 1, the internal sensor 3 is a detection device for detecting the driving state of the vehicle V. This internal sensor 3 includes at least one vehicle speed sensor, acceleration sensor, and yaw rate sensor. The vehicle speed sensor is a detector which detects the speed of the vehicle V. The acceleration sensor is, for example, a detector which detects the acceleration in the front-back direction of the vehicle V. The yaw rate sensor is a detector which detects the rotational angular speed about a vertical axis at a center of gravity of the vehicle V. The information which is detected by the vehicle speed sensor, acceleration sensor, and yaw rate sensor is transmitted to the electronic control unit 10.

In FIG. 1, the map database 4 shows a database related to the map information. This map database 4 is, for example, stored in an HDD (hard disk drive) which is mounted in the vehicle. The map information includes, for example, position information of the road, information of the road shape (for example curves and straight parts, curvature of curves, etc.), and position information of intersections and junctions. Note that, in the embodiment which is shown in FIG. 1, this map database 4 stores three-dimensional basic data of external fixed obstacles which are prepared using the LIDER 9 when the vehicle is made to be driven at the exact center of a driving lane.

In FIG. 1, the car navigation system 5 is a system which provides guidance to the operator of the vehicle V up to the destination which is set by the operator of the vehicle V. This car navigation system 5 uses the current position information of the vehicle V which is measured by the GPS receiver 2 and the map information of the map database 4 as the basis to calculate the target route up to the destination. The information of the target route of this vehicle V is transmitted to the electronic control unit 10.

In FIG. 1, the HMI 6 shows the interface between a driver or passenger of the vehicle V and the automated driving system of the vehicle for the output and input of information. This HMI 6, for example, is provided with a display panel for displaying image information to the driver or passenger, a speaker for audio output, operating buttons or a touch panel for the driver or passenger to perform an input operation, etc. In the HMI 6, if the driver or passenger performs an input operation to start the automated driving, a signal is sent to the ECU 10 and automated driving is started. Further, if the driver or passenger performs an input operation to stop the automated driving, a signal is sent to the ECU 10 and automated driving is stopped.

In FIG. 1, the actuator 7 is provided to perform the driving control of the vehicle V. This actuator 7 includes at least an accelerator actuator, brake actuator, and steering actuator. The accelerator actuator controls a throttle opening degree in accordance with the control signal from the electronic control unit 10 and thereby controls a drive force of the vehicle V. The brake actuator controls an amount of depression of a brake pedal in accordance with the control signal from the electronic control unit 10 and thereby controls a brake force which is applied to wheels of the vehicle V. The steering actuator controls a drive operation of a steering assist motor of a power steering system in accordance with a control signal from the electronic control unit 10 and thereby controls a steering action of the vehicle V.

The electronic control unit 10 comprises a CPU (central processing unit), ROM (read only memory), RAM (random access memory) etc. which are connected with each other by a bidirectional bus. Note that FIG. 1 shows the case of using a single electronic control unit 10, but a plurality of electronic control units can also be used. As shown in FIG. 1, the electronic control unit 10 has a vehicle position recognition unit 11, external condition recognition unit 12, running state recognition unit 13, driving plan generation unit 14, and driving control unit 15.

In an embodiment according to the present invention, in the vehicle position recognition unit 11, an initial position of the vehicle V on a map when automated driving is started is recognized based on the position information of the vehicle V which is received by the GPS receiver 2. If the initial position of the vehicle V when the automated driving is started is recognized, after that, in the external condition recognition unit 12, the external conditions of the vehicle V is recognized and the accurate position of the vehicle V is recognized. That is, in the external condition recognition unit 12, the external conditions of the vehicle V are recognized based on the results of detection of the external sensor 1 (for example, captured information of the camera 8, obstacle information from the radar, obstacle information from the LIDER 9, etc.). In this case, the external conditions include the positions of the white lines of a driving lane with respect to the vehicle V, position of the center of the lane with respect to the vehicle V, road width, shape of the road (for example, curvature of the driving lane, change in slope of the road surface, etc.), the state of obstacles in the surroundings of the vehicle V (for example, information differentiating fixed obstacles and moving obstacles, positions of obstacles relative to the vehicle V, direction of movement of obstacles relative to the vehicle V, relative speed of obstacles relative to the vehicle V, etc.), etc.

In this external condition recognition unit 12, when the initial position of the vehicle V when automated driving is started is recognized based on the position information of the vehicle V which is received by the GPS receiver 2, the current accurate position of the vehicle V is recognized by comparing the three-dimensional basic data of fixed obstacles which is stored in the map database 4 by the LIDER 9 and the current three-dimensional detected data of outside fixed obstacles of the vehicle V which are detected by the LIDER 9. Specifically speaking, the image position where the three-dimensional image of outside fixed obstacles which are detected using the LIDER 9 is exactly overlaid over the stored three-dimensional basic image of the outside fixed obstacles is found while shifting the three-dimensional image of outside fixed obstacles which are detected using the LIDER 9 a little at a time. The amount of shift of the three-dimensional image at this time expresses the amount of deviation of the vehicle from the exact center of the driving lane, so the current accurate position of the vehicle V can be recognized from the amount of this deviation.

Note that if finding the amount of deviation of the vehicle from the exact center of the driving lane in this way, when automated driving of the vehicle is started, the vehicle driving operation is controlled so that the vehicle is driven at the exact center of the driving lane. While driving in the lane, the work of finding the image position where the three-dimensional image of outside fixed obstacles which are detected using the LIDER 9 exactly overlays the stored three-dimensional basic image of the external fixed obstacles is continuously performed, and the driving operation of the vehicle is controlled so that the vehicle is driven at the exact center of the lane of the target route which is selected by the operator. Note that, in this external condition recognition unit 12, the presence of moving obstacles such as pedestrians is recognized by comparing the three-dimensional image of the external obstacles (fixed obstacles and moving obstacles) which is detected by the LIDER 9 and the stored three-dimensional basic image of external fixed obstacles.

In the running state recognition unit 13, the driving state of the vehicle V is recognized based on the result of detection of the internal sensor 3 (for example, vehicle speed information from the vehicle speed sensor, acceleration information from the acceleration sensor, rotational angular speed information of the yaw rate sensor, etc.). The driving state of the vehicle V includes, for example, the vehicle speed, acceleration, and rotational angular speed about the vertical axis at the center of gravity of the vehicle V.

In the driving plan generation unit 14, a driving plan of the host vehicle V along a target route which is set by the operator is prepared, that is, the course of the host vehicle is determined based on the map information of the map database 4, position of the host vehicle which is recognized by the vehicle position recognition unit 11 and external condition recognition unit 12, external conditions of the host vehicle V which are recognized by the external condition recognition unit 12 (position of other vehicles, direction of advance, etc.), and speed or acceleration of the host vehicle which is detected by the internal sensor 3, etc. In this case, the course is determined to reach the destination safely and in the shortest time while observing the law. Next, the method for determining this course will be simply explained while referring to FIG. 3 and FIG. 4.

Figure 3:
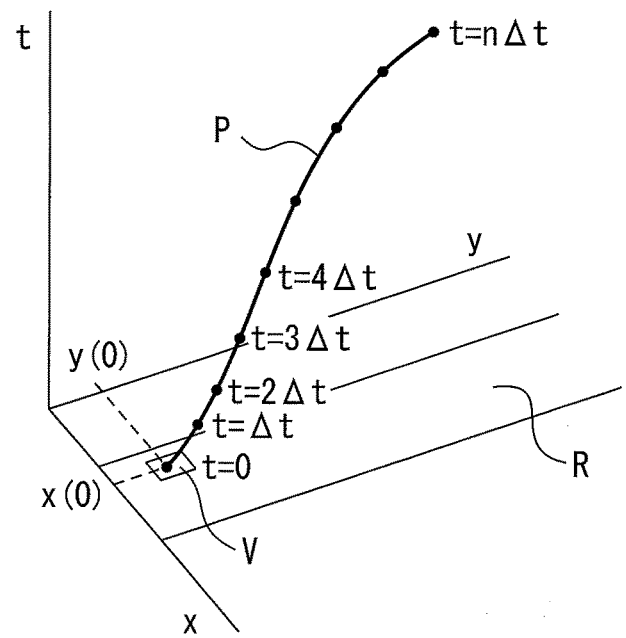
FIG. 3 is a view for explaining a transit path of a course of a host vehicle.
Figure 4:
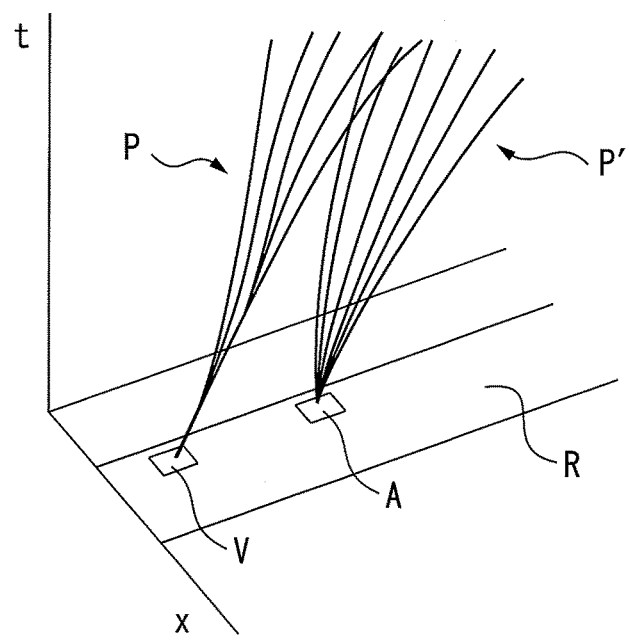
FIG. 4 is a view for explaining a transit path of a course of a host vehicle.

FIG. 3 and FIG. 4 show a three-dimensional space when using the axis perpendicular to the xy plane as the time axis "t". In FIG. 3, V shows the host vehicle present on the xy plane. The y-axis direction at the xy plane is made the direction of advance of the host vehicle V. Further, in FIG. 3, R shows the road over which the host vehicle V is currently being driven. In the driving plan generation unit 14, as shown in FIG. 3 by P, the transit path of the future course of the host vehicle V is generated in the three-dimensional space comprised of the xyz axes. The initial position of this transit path is the current position of the host vehicle V. The time "t" at this time is made zero (time t=0), while the position of the controlled vehicle V at this time is made (x(0), y(0)). Further, the driving state of the host vehicle V is expressed by the vehicle speed "v" and the direction of advance θ, and the driving state of the controlled vehicle V at the time t=0 is made (v(0), θ(0)).

Now then, the driving operation of the host vehicle V which is performed until Δt time (0.1 to 0.5 second) elapses from the time t=0 is selected from a predetermined plurality of operations. Giving a specific example, the acceleration is selected from among a predetermined plurality of values in the range of −10 to +30 km/h/sec, while the steering angle is selected from a predetermined plurality of values in the range of −7 to +7 degrees/sec. In this case, giving one example, the position (x(1), y(1)) of the host vehicle V and the driving state (v(1), θ(1)) of the host vehicle V after the Δt time (t=Δt) are found for all combinations of the plurality of values of acceleration and plurality of values of steering angle, and next, the position (x(2), y(2)) of the host vehicle V and the driving state (v(2), θ(2)) of the host vehicle V after further the Δt time, that is, after the 2Δt time (t=2Δt) are found. In the same way, the position (x(n), y(n)) of the host vehicle V and the driving state of the controlled vehicle V (v(n), θ(n)) after the nΔt time (t=nΔt) are found.

In the driving plan generation unit 14, a plurality of transit paths of the course are generated by connecting the positions (x, y) of the host vehicle V for all of the combinations of the plurality of values of acceleration and plurality of values of steering angle. In FIG. 3, P shows one representative transit path among the thus obtained transit paths. If a plurality of transit paths of the course are generated, the transit path which enables the destination to be reached safely and in the shortest time while observing the law is selected from these transit paths. The selected transit path is determined as the course of the host vehicle V. Note that, in FIG. 3, the projection of this transit path on the xy plane on the road R becomes the actual course of the host vehicle V.

Next, while referring to FIG. 4, one example of the method of selecting a transit path enabling a destination to be reached safely and in the shortest time while observing the law from a plurality of transit paths of the course will be briefly explained. In FIG. 4, V, like in FIG. 3, shows a host vehicle, while A shows another vehicle which is advancing in the same direction as the host vehicle V in front of the host vehicle V. Note that FIG. 4 shows a plurality of transit paths P of the course which are generated for the host vehicle V. Further, in the driving plan generation unit 14, a plurality of transit paths of the course are generated for combinations of the plurality of values of acceleration and the plurality of values of steering angle for the other vehicle A as well. The plurality of transit paths of the course which are generated for the other vehicle A are shown by P' in FIG. 4.

In the driving plan generation unit 14, first, it is judged for all transit paths P, based on external information which is recognized by the external condition recognition unit 12, whether the host vehicle V can be driven on the road R and whether the host vehicle V will contact any fixed obstacle or pedestrian when the host vehicle V is advancing according to a transit path P. If it is judged that the host vehicle V cannot be driven on the road R or when it is judged that the host vehicle V will contact a fixed obstacle or pedestrian when the controlled vehicle V is advancing according to the transit path P, that transit path is excluded from the options and the remaining transit paths P are judged for interference with the other vehicle A.

That is, in FIG. 4, when a transit path P and a transit path P' intersect, it means that at the intersecting time "t", the host vehicle V and the vehicle A will collide. Therefore, if there is a transit path P which intersects with a transit path P' among the above-mentioned remaining transit paths P, the transit path P which intersects with the transit path P' is excluded from the options and the transit path P which enables the destination to be reached in the shortest time is selected from among the remaining transit paths P. In this way, the transit path P which enables a destination to be reached safely and in the shortest time while observing the law is selected from the plurality of transit paths of the course.

If the transit path P is selected, the position (x(1), y(1)) of the host vehicle V and the driving state (v(1), θ(1)) of the host vehicle V at the time t=Δt on the selected transit path P, the position (x(2), y(2)) of the host vehicle V and the driving state (v(2), θ(2)) of the host vehicle V at the time t=2Δt on the selected transit path P, . . . and the position (x(n), y(n)) of the host vehicle V and the driving state (v(n), θ(n)) of the host vehicle V at the time t=nΔt on the selected transit path P are output from the driving plan generation unit 14, and in the driving control unit 15, the driving operation of the host vehicle is controlled based on these positions of the host vehicle V and driving states of the host vehicle V.

Next, at the time t=Δt, the time "t" at this time is made zero (time t=0), the position of the host vehicle V is made (x(0), y(0)), the driving state of the host vehicle V is made (v(0), θ(0)), a plurality of transit paths P of the course are generated again for the combinations of the plurality of values of acceleration and plurality of values of steering angle, and the optimum transit path P is selected from these transit paths P. If the transit optimum path P is selected, the positions of the host vehicle V and the driving states of the host vehicle V at the times t=Δt, 2Δt, . . . nΔt on the selected transit path P are output from the driving plan generation unit 14, and in the driving control unit 15, the driving operation of the host vehicle is controlled based on these positions of the host vehicle V and driving states of the host vehicle V. After this, the above operations are repeated.

Figure 5:
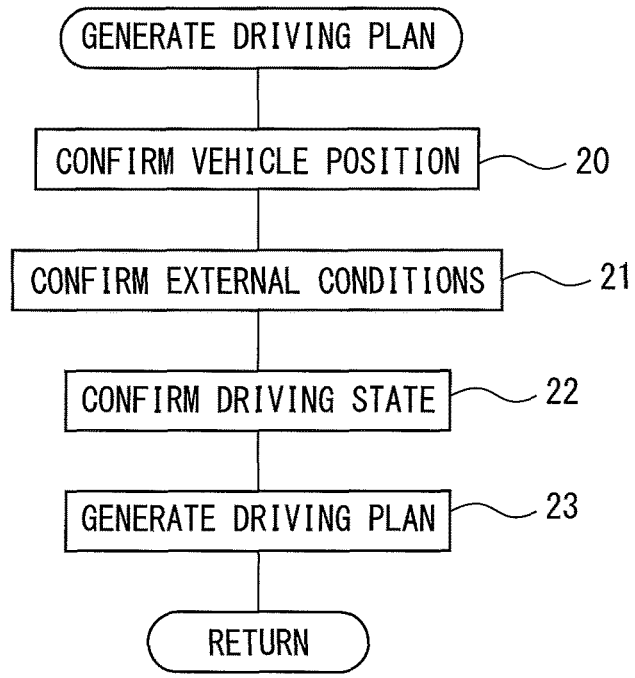
FIG. 5 is a flow chart for generating a driving plan.
Figure 6:
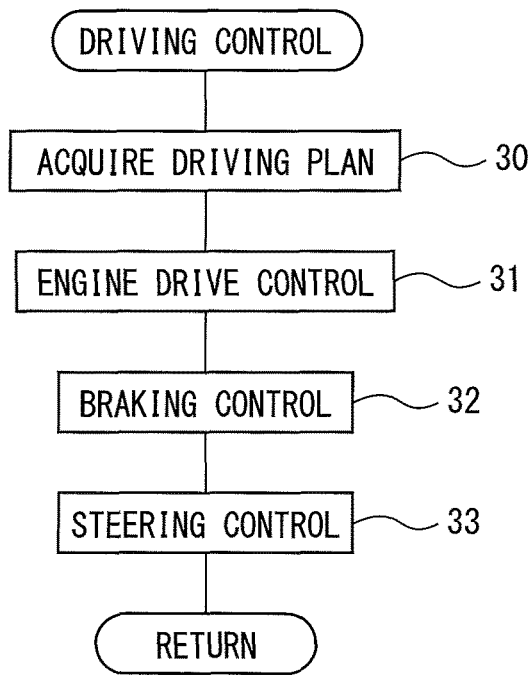
FIG. 6 is a flow chart for performing a driving control.

Next, the basic processing which is performed by the automated driving system of a vehicle will be briefly explained while referring to the flow charts shown in FIG. 5 and FIG. 6. For example, if the operator sets a destination in the car navigation system 5 and performs an input operation to start the automated driving operation at the HMI 7, the routine for generation of a driving plan which is shown in FIG. 5 is repeatedly performed at the ECU 10.

That is, first, at step 20, the position of the host vehicle V is recognized by the vehicle position recognition unit 11 based on the position information of the vehicle V which is received by the GPS receiver 2. Next, at step 21, the external conditions of the host vehicle V and the accurate position of the host vehicle V are recognized by the external condition recognition unit 12 based on the results of detection of the external sensor 1. Next, at step 22, the driving state of the vehicle V is recognized by the running state recognition unit 13 based on the results of detection of the internal sensor 3. Next, at step 23, in the manner as explained with reference to FIG. 3 and FIG. 4, a driving plan of the vehicle V is generated by the driving plan generation unit 14. The driving control of the vehicle is performed based on this driving plan. The routine for this driving control of the vehicle is shown in FIG. 6.

Referring to FIG. 6, first, at step 30, the driving plan which is generated by the driving plan generation unit 14, that is, the positions (x, y) of the host vehicle V and the driving states (v, θ) of the host vehicle V at the times from t=Δt to t=nΔt on the selected transit path P are read in. Then, based on the positions (x, y) of the host vehicle V and the driving states (v, θ) of the host vehicle V at these times, at step 31, the drive control of the engine of the vehicle V and control the engine auxiliaries etc. are performed. At step 32, the control for braking the vehicle V and control of the braking lights etc. are performed, and, at step 33, the steering control and control of the direction lights etc. are performed. These controls are updated each time acquiring an updated new driving plan at step 30.

Automated driving of the vehicle V along the driving plan generated in this way is performed. When an automated driving operation of the vehicle V is performed and the vehicle V reaches the destination or when the operator performs an input operation at the HMI 7 to make the automated driving operation stop in the middle of the automated driving operation of the vehicle V being performed, the automated driving operation is made to end.

Next, while referring to FIG. 7A, one example of the drive control of an engine of the vehicle V based on a driving plan which is generated by the driving plan generation unit 14 will be schematically explained. This FIG. 7A shows the road conditions, the vehicle speed "v" of the vehicle V, and the required drive torque TR with respect to the vehicle V. Note that, in FIG. 7A, the vehicle speed "v" shows one example of the vehicle speed based on the driving plan from the driving plan generation unit 14. The example which is shown in FIG. 7A shows the case where the vehicle V is stopped at the time t=0, the vehicle V is accelerated in operation from the time t=0 to the time t=Δt, the vehicle is driven at a constant speed from the time t=Δt to the time t=7Δt even if the road becomes an upward slope midway, and the vehicle speed "v" is decreased at the downward slope after the time t=7Δt.

Now then, in an embodiment according to the present invention, the acceleration A(n) of the direction of advance of the vehicle VB to be applied to the vehicle V is found from the vehicle speed "v" based on the driving plan generated by the driving plan generation unit 14, the required drive torque TR for the vehicle V is found from this acceleration A(n), and the drive operation of the engine is controlled so that the drive torque for the vehicle V becomes this required drive torque TR. For example, as shown in FIG. 7B, if assuming that a vehicle of the mass M is accelerated from v(n) to v(n+1) during the time Δt, the acceleration A(n) in the direction of advance of the vehicle at this time, as shown in FIG. 7B, is expressed by acceleration A(n)=(v(n+1)−v(n))/Δt. If assuming the force which acts on the vehicle V at this time to be F, this force F is expressed by the product (=M·A(n)) of the mass M of the vehicle V and the acceleration A(n). On the other hand, if making the radius of the drive wheels of the vehicle V to be "r", the drive torque TR for the vehicle V is expressed by F·r. Therefore, the required drive torque TR for the vehicle V is expressed by C·A(n) (=F·r=M·A(n)·r) where C is a constant.

If the required drive torque TR(=C·A(n)) for the vehicle V is found, the drive operation of the engine is controlled so that the drive torque with respect to the vehicle V becomes this required drive torque TR. Specifically speaking, the engine load, i.e., the opening degree of the throttle valve and the gear ratio of the transmission are controlled so that the drive torque with respect to the vehicle V becomes this required drive torque TR. Namely, the gear ratio of the transmission is determined in advance as a function of the vehicle speed "v" and the required drive torque TR, and accordingly, if the vehicle speed "v" and the required drive torque TR are determined, the target gear ratio of the transmission is determined. If the target gear ratio of the transmission is determined, the engine speed and the engine output torque which give the vehicle speed "v" and the required drive torque TR are determined, and if the engine output torque is determined, the target opening degree of the throttle valve which gives this engine output torque is determined. In this way, the target gear ratio of the transmission and the target opening degree of the throttle valve are determined, and the gear ratio of the transmission and the opening degree of the throttle valve are controlled so as to become the target gear ratio of the transmission and the target opening degree of the throttle valve, respectively.

On the other hand, when the road is an upward slope, compared with the case of a flat road, a larger drive torque becomes required to drive the vehicle V. That is, as shown in FIG. 7C, on an upward slope, if making the acceleration of gravity "g" and the slope "θ", an acceleration AX (=g·SIN θ) acts on the vehicle V of the mass M in a direction causing the vehicle V to move backward. That is, a deceleration AX (=g·SIN θ) acts on the vehicle V. At this time, the required drive torque TR for the vehicle V which is required for preventing the vehicle V from moving backward is expressed by C·AX(=F·r=M·AX·r) where C is a constant. Therefore, when the vehicle V is being driven on an upward slope, the required drive torque TR for the vehicle V is made to increase by exactly this drive torque C·AX.

Therefore, in the example which is shown in FIG. 7A, the required drive torque TR for the vehicle V is increased during the period of the time t=0 to the time t=Δt when the vehicle V is being operated under acceleration, the required drive torque TR for the vehicle V is decreased somewhat during the period of the time t=Δt to the time t=3Δt when the vehicle V is being driven on a flat road, the required drive torque TR for the vehicle V is greatly increased during the period of the time t=3Δt to the time t=5Δt when the vehicle V is being driven on an upward slope at a constant speed, the required drive torque TR for the vehicle V is decreased, compared with when being driven on an upward slope at a constant speed, during the period from the time t=5Δt to the time t=7Δt when the vehicle V is being driven on a flat road at a constant speed, and the required drive torque TR for the vehicle V is further decreased during the period after the time t=7Δt when the vehicle V is being driven on a downward slope while decelerated somewhat.

Figure 8:
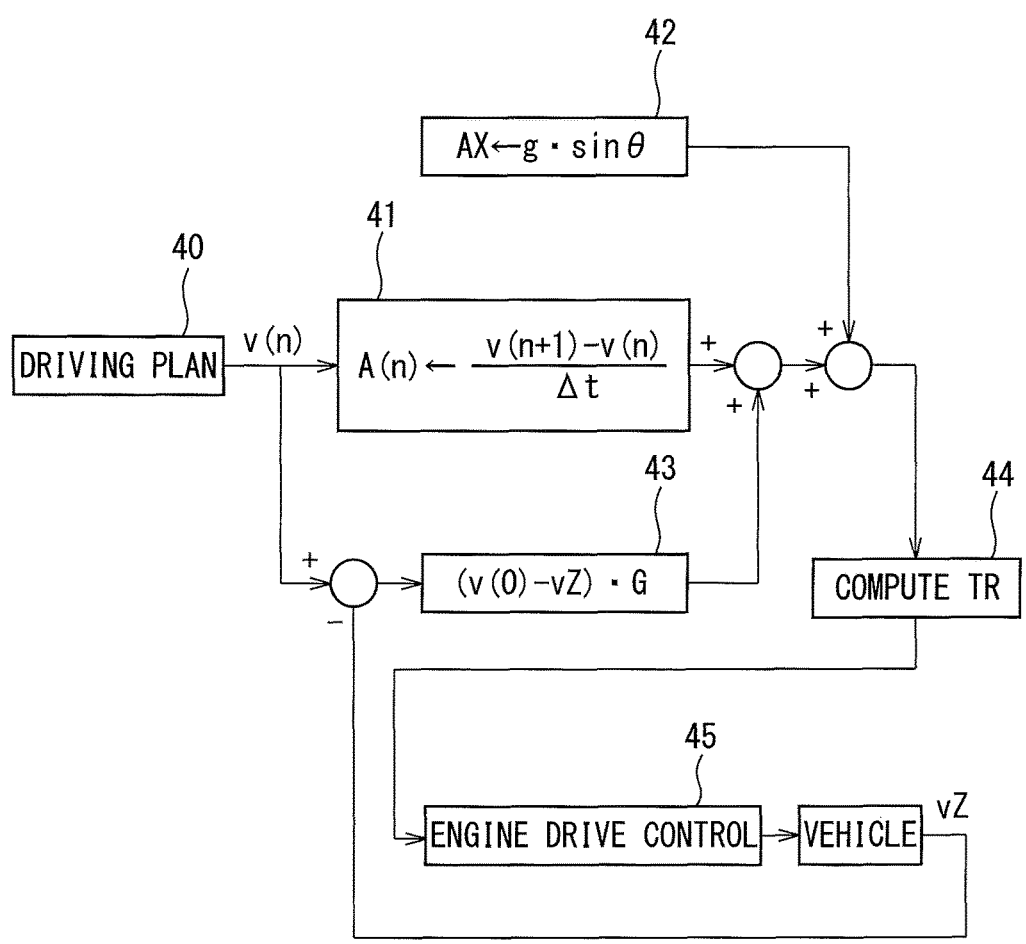
FIG. 8 is a view of a control structure of engine drive control based on a driving plan of a vehicle.

FIG. 8 shows a view of the control structure of the engine drive control based on a driving plan of the vehicle. If the vehicle speed at the current time (time=0) which is generated based on the driving plan 40 is made "v(0)", in an embodiment according to the present invention, feed forward control which controls the vehicle speed at the time t=Δt after the Δt time to the vehicle speed v(1) generated based on the driving plan 40 and feedback control which controls the actual vehicle speed to the vehicle speed "v" generated based on the driving plan 40 are performed simultaneously in parallel. In this case, it is difficult to understand these feed forward control and feedback control if explained simultaneously, so first the feed forward control will be explained, then the feedback control will be explained.

Referring to FIG. 8, in the feed forward control unit 41, the acceleration A(0)=(v(1)−v(0))/Δt in the direction of advance of the vehicle V when changing the vehicle speed from v(0) to v(1) based on the vehicle speed v(0) at the current time (time t=0) which is generated based on the driving plan 40 and the vehicle speed v(1) at the time t=Δt which is generated based on the driving plan 40. On the other hand, in the slope correction unit 42, the acceleration AX (=g·SIN θ) at the upward slope or downward slope which was explained referring to FIG. 7C is calculated. The acceleration A(0) obtained by the feed forward control unit 41 and acceleration AX obtained by the slope correction unit 43 are added, and in the calculation unit 44 of the required drive torque TR, the required drive torque TR for the vehicle V is calculated from the sum (A(0)+AX) of the acceleration A(0) obtained by the feed forward control unit 41 and the acceleration AX obtained by the slope correction unit 42.

This sum (A(0)+AX) of the acceleration expresses the acceleration which is required for making the vehicle speed change from v(0) to v(1). Therefore, if changing the required drive torque TR for the vehicle V based on this sum (A(0)+AX) of acceleration, the vehicle speed at the time t=Δt is calculated as becoming v(1). Therefore, in the next engine drive control unit 45, the drive operation of the engine is controlled so that the drive torque for the vehicle V becomes this required drive torque TR and thereby the vehicle is automatically driven. If changing the required drive torque TR for the vehicle V based on this sum (A(0)+AX) of acceleration in this way, the vehicle speed at the time t=Δt is calculated as becoming v(1). However, the actual vehicle speed deviates from v(1). To eliminate this deviation, feedback control is performed.

That is, in the feedback control unit 43, the required drive torque TR for the vehicle V is controlled by feedback so that the difference (=v(0)−vz) of the current vehicle speed v(0) which is generated based on the driving plan 40 and the actual vehicle speed vz becomes zero, that is, the actual vehicle speed vz becomes the current vehicle speed v(0) which is generated based on the driving plan 40. Specifically, in the feedback control unit 41, the value (v(0)−vz)·G which is obtained by multiplying the difference (=v(0)−vz) of the current vehicle speed v(0) and the actual vehicle speed vz with a predetermined gain G is calculated, and the value of (v(0)−vz)·G which is obtained by the feedback control unit 41 is added to the acceleration A(0) which is obtained by the feed forward control unit 41.

In this way, the actual vehicle speed vz is controlled to the vehicle speed v(n) which is generated based on the driving plan 40. Note that, at the driving plan 40, the vehicle speeds v(0), v(1), v(2) . . . at the times t=0, t=Δt, t=2Δt . . . are generated. In the feed forward control unit 41, the accelerations A(0), A(1), A(2) . . . of the direction of advance of the vehicle V at the times t=0, t=Δt, t=2Δt . . . are calculated based on these vehicle speeds v(n), while in the calculation unit 44 of the required drive torque TR, the required drive torque TR for the vehicle V at the times t=0, t=Δt, t=2Δt . . . are calculated based on these accelerations A(0), A(1), A(2). That is, in the calculation unit 44 of the required drive torque TR, the predicted values of the future required drive torque TR at the times t=0, t=Δt, t=2Δt . . . are calculated.

Now then, in the drive control of the engine according to an embodiment of the present invention, a future change of the operating state of the engine is predicted from the driving plan, and an advanced control of a control command value of an engine operation control device where the control command value of the engine operation control device is made to change in a direction determined in accordance with the predicted operating state of the engine, that is, in the optimum direction for the predicted operating state of the engine is started in advance of the predicted change of the operating state of the engine before the predicted change of the operating state of the engine occurs. If performing such advanced control of a control command value, it is possible to make the operating state of the engine the optimum operating state when the operating state of the engine becomes the predicted operating state of the engine.

On the other hand, in the operating control of an engine according to an embodiment of the present invention, when, during automated driving, for example, a pedestrian suddenly jumps out in front of the vehicle, this is detected by the external sensor 1 and the vehicle is made to rapidly stop. In this regard, at this time, if the above-mentioned advanced control of a control command value is performed based on the predicted operating state of the engine and this advanced control of a control command value is continued even when the vehicle is made to rapidly stop, since the operating state of the engine will not become the predicted operating state, the operating state of the engine will deviate from the optimum operating state. Therefore, in the present invention, the advanced control of a control command value is stopped when there is a demand for sudden stop of the vehicle contrary to the driving plan of the vehicle along the predetermined target route based on the information on the surroundings of the vehicle detected by the detection sensor.

Figure 9:
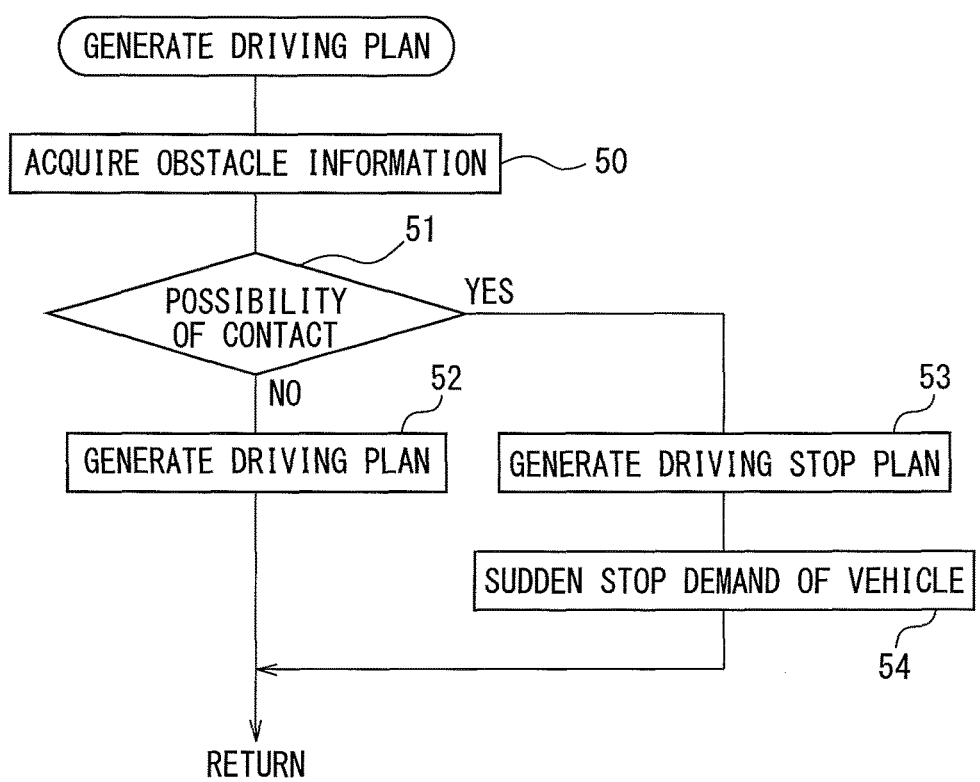
FIG. 9 is a flow chart for generating a driving plan.

Next, referring to FIG. 9 to FIG. 26, the drive control of the engine according to an embodiment of the present invention will be explained. FIG. 9 shows the processing for generating a driving plan at step 23 of FIG. 5 for performing the drive control of an engine according to an embodiment of the present invention. Referring to FIG. 9, first, at step 50, obstacle information which is detected by the external sensor 1 is acquired. This obstacle information is information relating to moving obstacles which can move such as persons, animals, bicycles etc. which are present in front of the host vehicle V. At this step 50, for example, when a pedestrian suddenly jumps out in front of the vehicle, it is judged that there is a moving obstacle in front of the host vehicle V.

Next, at step 51, it is judged if there is the possibility of the host vehicle V contacting a moving obstacle based on the obstacle information which is acquired at step 50. When it is judged that there is no possibility of the host vehicle V contacting a moving obstacle, the routine proceeds to step 52 where a driving plan of the vehicle V is generated by the driving plan generation unit 14 in the manner as explained with reference to FIG. 3 and FIG. 4. As opposed to this, when it is judged that there is a possibility of the host vehicle V contacting a moving obstacle, the routine proceeds to step 53 where a driving stop plan for making the vehicle rapidly stop is generated, then the routine proceeds to step 54 where a demand for sudden stop of the vehicle is issued. In this way, in an embodiment of the present invention, when avoiding contact with an external moving obstacle which is detected by the detection sensor 1, the demand for sudden stop of the vehicle is issued. Note that, when generation processing of a driving plan which is shown in FIG. 9 for the operating control of an engine according to an embodiment of the present invention is performed, at step 30 of FIG. 6, the driving plan generated at step 52 of FIG. 9 and the driving stop plan generated at step 53 of FIG. 9 are acquired.

Figure 10:
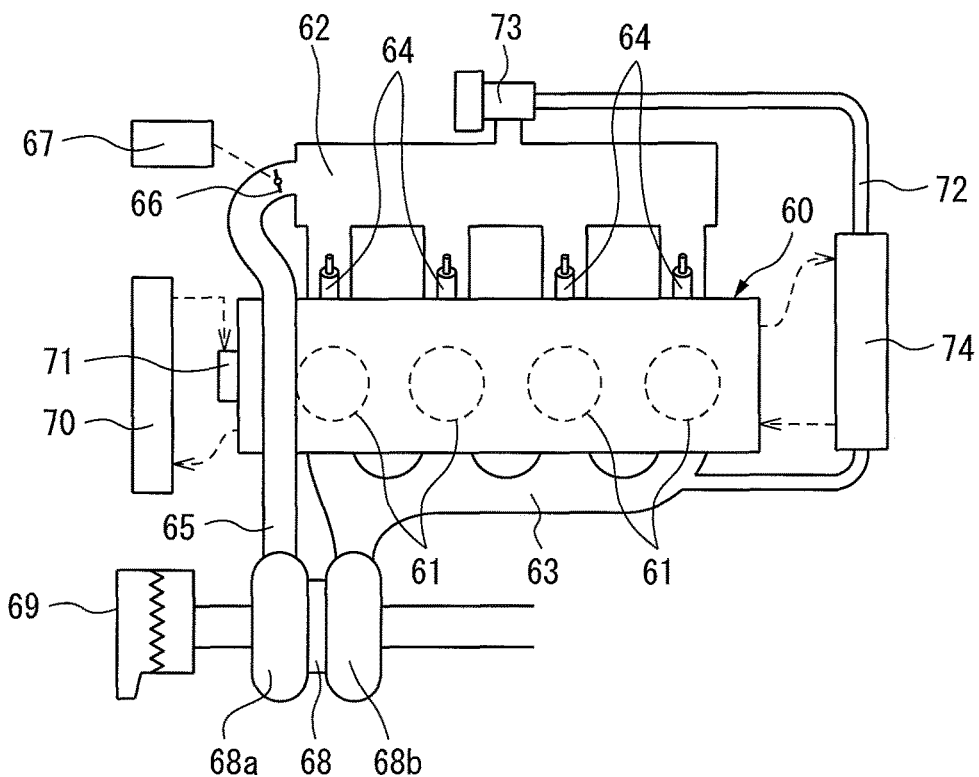
FIG. 10 is a view which schematically shows an engine as a whole.

Next, the operating control of an engine according to an embodiment of the present invention will be explained while giving specific examples. Note that, first, the engine parts relating to the operating control of an engine according to an embodiment of the present invention will be explained in brief. FIG. 10 schematically shows an engine as a whole. Referring to FIG. 10, 60 is an engine body, 61 is a combustion chamber, 62 is an intake manifold, 63 is an exhaust manifold, 64 is a fuel injector which is arranged at each intake branch pipe of the intake manifold 62, 65 is an intake duct, 66 is a throttle valve which is arranged in the intake duct 65, 67 is an actuator for driving the throttle valve 66, 68 is a supercharger, 69 is an air cleaner, 70 is a radiator, 71 is a water pump which is driven by the engine, 72 is an exhaust gas recirculation (below, referred to as EGR) device for recirculating exhaust gas in the exhaust manifold 63 to the inside of the intake manifold 62, 73 is an EGR control valve for controlling the EGR amount, and 74 is an EGR cooler for cooling the EGR gas which flows through the inside of the EGR passage 72.

Note that, in the embodiment which is shown in FIG. 10, the supercharger 68 is comprised of an exhaust turbocharger. The intake air is fed through the air cleaner 69, intake compressor 68a, intake duct 65, and intake manifold 62 to the inside of the combustion chamber 61, while the exhaust gas discharged from the combustion chamber 61 to the inside of the exhaust manifold 63 is discharged through the exhaust turbine 68b to the atmosphere. The engine cooling water in the engine body 60 is fed by the water pump 71 to the inside of the radiator 70 and cooled by the radiator 70. The engine cooling water is fed into the EGR cooler 74 and the EGR gas is cooled by this engine cooling water. Note that, in FIG. 10, the broken line arrow shows the flow of engine cooling water.

Figure 11A:
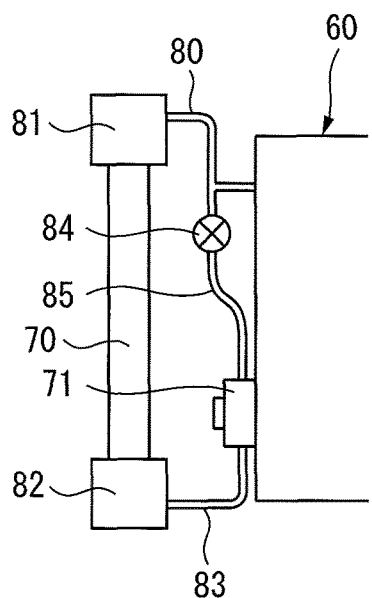
FIGS. 11A and 11B are views which schematically show the surroundings of a radiator.
Figure 11B:
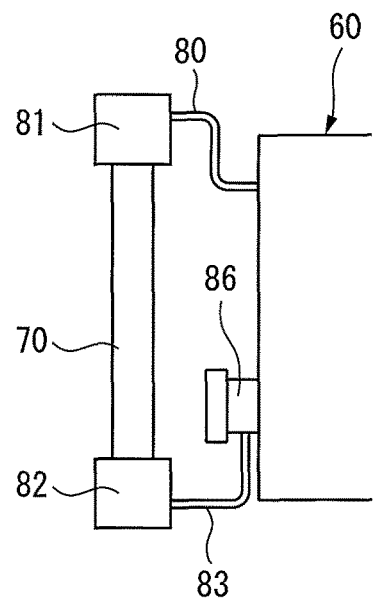

FIG. 11A and FIG. 11B show other examples of the surroundings of the radiator 70. In the example which is shown in FIG. 11A, the engine cooling water in the engine body 60 is fed through a cooling water feed pipe 80 to an upper tank 81 of the radiator 70, then the engine cooling water which is cooled by the radiator 70 is returned through a lower tank 82 and cooling water return pipe 83 by the water pump 71 to the inside of the engine body 60. In the example which is shown in FIG. 11A, the cooling water feed pipe 80 is connected through a flow control valve 84 and cooling water return pipe 85 to the water pump 71, and the greater the opening degree of the flow control valve 84 becomes, the more the amount of engine cooling water which is returned through the water pump 71 to the inside of the engine body 60 is increased. On the other hand, in the example which is shown in FIG. 11B, the engine cooling water which is cooled by the radiator 70 is returned through the lower tank 82 and cooling water return pipe 83 by an electric water pump 86 to the inside of the engine body 60.

Figure 12:
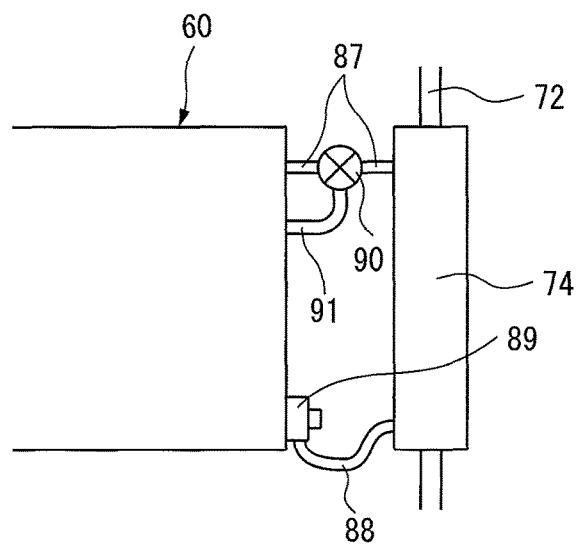
FIG. 12 is a view which schematically shows the surroundings of an EGR cooler.

FIG. 12 shows the surroundings of the EGR cooler 74. In the example which is shown in FIG. 12, the engine cooling water in the engine body 60 is fed through a cooling water feed pipe 87 to the inside of the EGR cooler 74. The engine cooling water which is raised in temperature due to cooling the EGR gas is returned through a cooling water return pipe 88 by a water pump 89 to the inside of the engine body 60. Further, in the example which is shown in FIG. 12, a bypass valve 90 is arranged in the cooling water feed pipe 80. This bypass valve 90 is connected through a cooling water return pipe 91 to the inside of the engine body 60. If increasing the opening degree of the bypass valve 90 to the EGR cooler 74 side, the amount of the engine cooling water which is fed to the inside of the EGR cooler 74 is increased, and the amount of engine cooling water which is returned from the bypass valve 90 through the cooling water return pipe 91 to the inside of the engine body 60 is made to decrease.

Figure 13A:
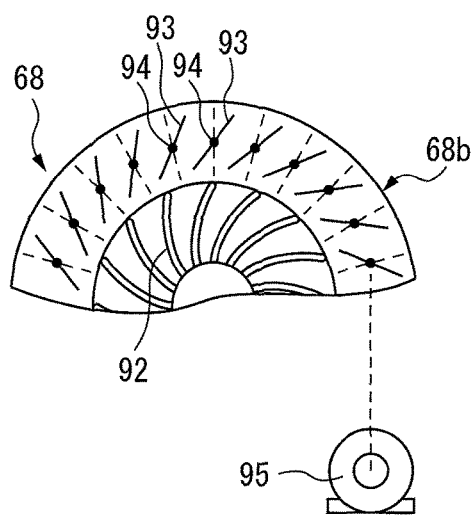
FIGS. 13A and 13B are views which schematically show a supercharger.
Figure 13B:
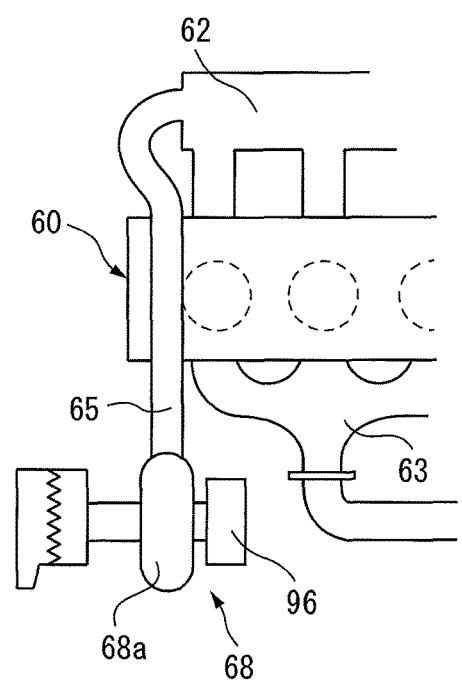

FIG. 13A and FIG. 13B show other examples of the supercharger 68. In the example which is shown in FIG. 13A, the supercharger 68 is comprised of an exhaust turbocharger. FIG. 13A schematically shows the surroundings of a turbine rotor 92 of a variable nozzle type exhaust turbine 68*b* of an exhaust turbocharger. In this example, as shown in FIG. 13A, inside the exhaust flow passage formed around the turbine rotor 92 and heading toward the turbine rotor 92, a plurality of movable vanes 93 which can pivot about pivot shafts 94 are arranged over the entire circumference of the turbine rotor 92. All of the movable vanes 93 are control to pivot simultaneously by an actuator 95. In this example, if the movable vanes 93 are made to pivot from the positions shown by the broken lines to the positions shown by the solid lines in FIG. 13A, the opening area of the nozzle formed between the movable vanes 93, that is, the opening degree of the nozzle, changes in the decreasing direction. On the other hand, in the example which is shown in FIG. 13B, the intake compressor 68*a* of the supercharger 68 is comprised of an electric turbocharger which is driven by an electric motor 96.

Figure 14:
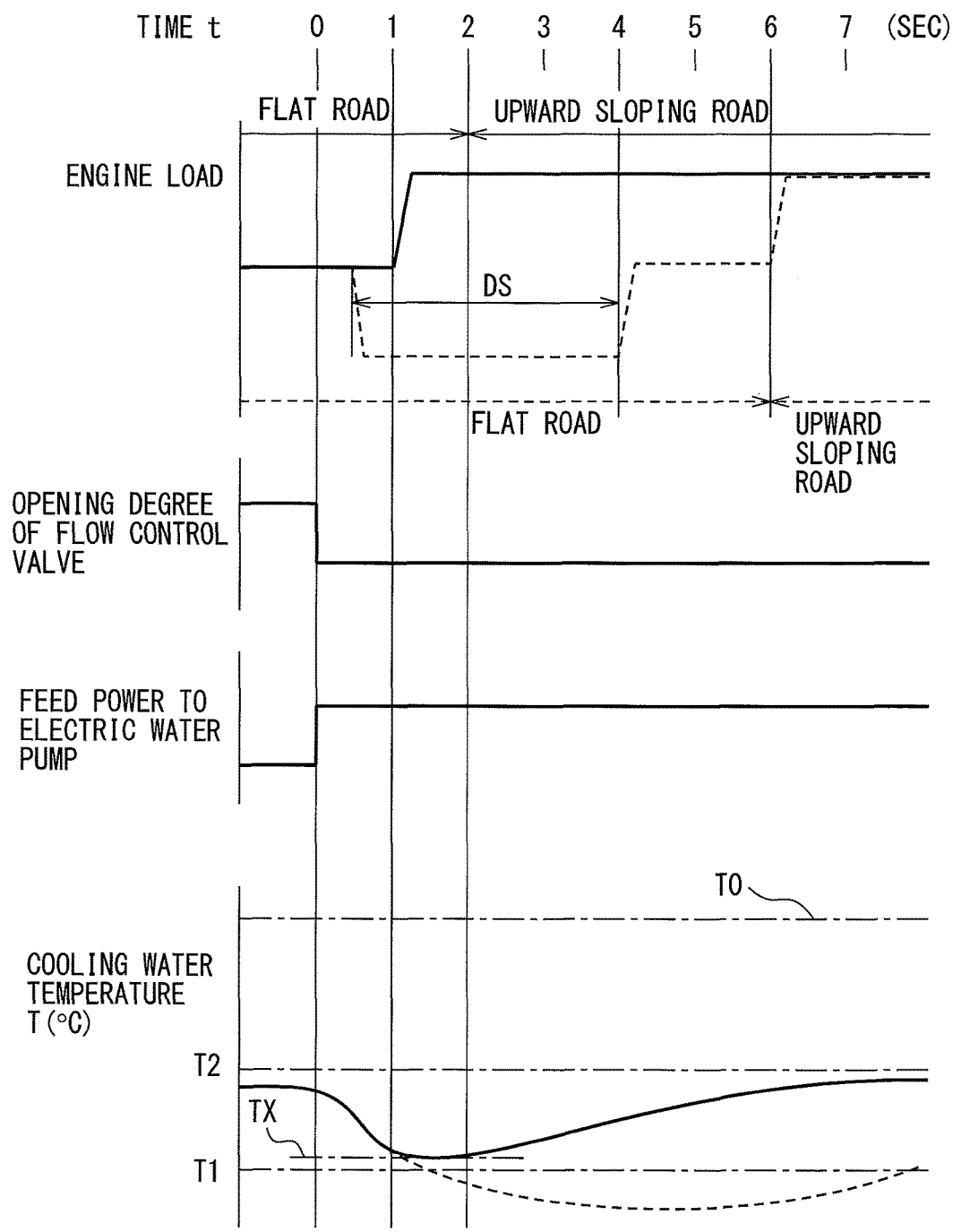
FIG. 14 is a time chart of control of a cooling water temperature of the engine according to the present invention.

Next, using as an example the case where the host vehicle V is currently being automatically driven on a flat road and the road will soon become an upward slope or downward slope, several embodiments according to the present invention will be successively explained. FIG. 14 shows a time chart in the case where the control subject which is controlled in advance in the operating control of an engine according to an embodiment of the present invention is the engine cooling water, and in this FIG. 14, a change of the load of the engine, a change of the opening degree of the flow control valve 84 which is shown in FIG. 11A, a change of the feed power to the electric water pump 86 which is shown in FIG. 11B, and a change of the cooling water temperature T in the engine body 60 are shown. In FIGS. 14, T1 and T2 respectively show the lower limit value and the upper limit value of the optimum cooling water temperature T, while TO shows the cooling water temperature at which the engine overheats. Note that this FIG. 14 shows together the case where the engine operation control device which is controlled in advance is the flow control valve 84 shown in FIG. 11A and the control command value of the engine operation control device which is controlled in advance is the opening degree of the flow control valve 84 and the case where the engine operation control device which is controlled in advance is the electric water pump 86 shown in FIG. 11B and the control command value of the engine operation control device which is controlled in advance is the feed power to the electric water pump 86.

Now then, if the road changes from a flat road to an upward slope, as explained while referring to FIG. 7A, the required drive torque TR becomes higher. If the required drive torque TR becomes higher, as shown in FIG. 14, the load of the engine is made to increase and the fuel injection amount from the fuel injector 64 is made to increase. As a result, the amount of heat generation in the combustion chamber 61 increases and the cooling water temperature T in the engine body 60 rapidly rises. Therefore, depending on the cooling water temperature T when the road changes from a flat road to an upward slope and the load of the engine starts to be increased, the cooling water temperature T greatly exceeds the upper limit value T2 while the load of the engine is made to increase, and the engine cooling water ends up overheating in some cases. To prevent the engine cooling water from overheating in this way, it is sufficient to lower the cooling water temperature T when the engine load is increasing to a target temperature where the temperature will not exceed the upper limit value T2 even if the load of the engine increases.

However, time is required for lowering the cooling water temperature T, therefore it is necessary to start the action of lowering the cooling water temperature T before the road changes from a flat road to an upward slope and the load of the engine starts to be increased. In this case, in the automated driving system of a vehicle which is used in an embodiment of the present invention, the road changing from a flat road to an upward slope can be predicted from the position information of the vehicle V, map information of the map database 4, and driving state of the vehicle V. Therefore, in an embodiment of the present invention, the action of lowering the cooling water temperature T is made to start in advance before the road changes from a flat road to an upward slope and the load of the engine starts to be increased.

The solid line of FIG. 14 shows the case where at the time t=1 the road changes from a flat road to an upward slope and therefore at the time t=1 the load of the engine starts to be increased. Further, FIG. 14 shows the case where it is predicted that the load of the engine will start to be increased at the time t=1, so at the time t=0 before reaching the time t=1, the action of lowering the cooling water temperature T is started. That is, in this example, the action of lowering the cooling water temperature T is started a fixed time before the time when it is predicted the load of the engine will start to be increased. Note that, in the example which is shown in FIG. 11A, if the opening degree of the flow control valve 84 is made to decrease, the amount of engine cooling water which is fed to the radiator 70 increases, so the temperature of the engine cooling water at the inside of the engine body 60 falls. Therefore, in the example which is shown in FIG. 11A, at the time t=0, the opening degree of the flow control valve 84 is made to decrease so as to start the action of lowering the cooling water temperature T. On the other hand, in the example which is shown in FIG. 11B, if making the feed power to the electric water pump 86 increase, the amount of engine cooling water which flows through the inside of the radiator 70 increases, so the engine cooling water temperature in the engine body 60 falls. Therefore, in the example which is shown in FIG. 11B, at the time t=0, the feed power to the electric water pump 86 is made to increase, so the action of lowering the cooling water temperature T is started.

In this way, before the road changes from a flat road to an upward slope, if, at the time t=0, making the opening degree of the flow control valve 84 decrease or making the feed power to the electric water pump 86 increase, as shown in FIG. 14 by the solid line, at the time t=1, the engine cooling water will fall in temperature. Therefore even if the road changes from a flat road to an upward slope and even if the load of the engine is made to increase, the engine cooling water will not overheat, and the cooling water temperature T in the engine body 60 is maintained at an optimum temperature between the lower limit value T1 and the upper limit value T2.

On the other hand, the broken line in FIG. 14 shows the case where the action of lowering the cooling water temperature T is started, then, before the road changes from a flat road to an upward slope, for example, a pedestrian suddenly jumps out in front of the vehicle and causes the demand for sudden stop DS of the vehicle to be issued. As will be understood from the broken line in FIG. 14, if the demand for sudden stop DS of the vehicle is issued, the engine load is made to rapidly fall. In this case, sometimes the vehicle is completely stopped in accordance with the driving stop plan and sometimes the vehicle is made to rapidly decelerate, then is made to be driven at a low speed. In the example which is shown in FIG. 14, as will be understood from the broken line, the demand for sudden stop DS of the vehicle is issued and the vehicle is completely stopped or the vehicle is made to be driven at a low speed, then at the time t=4, normal automated driving is started.

In this regard, when in this way the demand for sudden stop DS of the vehicle is issued, as shown by the solid line in FIG. 14, if continuing to make the opening degree of the flow control valve 84 decrease or continuing to make the feed power to the electric water pump 86 increase, regardless of the engine load being low, the action of lowering the cooling water temperature T is continued. As a result, as shown by the broken line in FIG. 14, the cooling water temperature T falls to the lower limit value T1 or less and the engine cooling water becomes overcooled. If the engine cooling water is overcooled, a problem occurs in that the engine oil will rise in viscosity, and the fuel consumption is increased due to the increase in wear caused by the increase in viscosity.

Therefore, in an embodiment of the present invention, to prevent the engine cooling water from being overcooled in this way, when the demand for sudden stop DS of the vehicle is issued, the advanced control for lowering the water temperature where the cooling water temperature T is made to fall in advance is stopped. Next, this will be explained with reference to FIG. 15 which, like FIG. 14, shows the change of the load of the engine, the change of the opening degree of the flow control valve 84 shown in FIG. 11A, the change of the feed power to the electric water pump 86 shown in FIG. 11B, and the change of the cooling water temperature T in the engine body 60.

FIG. 15 shows the case where it is predicted that the road will change from a flat road to an upward slope, so, at the time t=0, the opening degree of the flow control valve 84 is decreased or the feed power to the electric water pump 86 is increased, then after that, before the road changes from a flat road to an upward slope, the demand for sudden stop DS of the vehicle is issued. In this case, in an embodiment of the present invention, as shown in FIG. 15, as soon as the demand for sudden stop DS of the vehicle is issued, the opening degree of the flow control valve 84 is increased or the feed power to the electric water pump 86 is decreased. That is, the advanced control for lowering the water temperature where the cooling water temperature T is made to fall in advance is stopped. If, in this way, the advanced control for lowering the water temperature where the cooling water temperature T is made to fall in advance is stopped, as shown in FIG. 15, the cooling water temperature T in the engine body 60 can be maintained at the optimum temperature between the lower limit value T1 and the upper limit value T2 and the engine cooling water can be prevented from being overcooled.

The opening degree of the flow control valve 84, when the advanced control for lowering the water temperature where the cooling water temperature T is made to fall in advance is stopped, is made to increase until the target opening degree corresponding to the operating state of the engine. In this case, the opening degree of the flow control valve 84 may be returned to the opening degree before the advanced control for lowering the water temperature where the cooling water temperature T is made to fall in advance is stopped. Further, the feed power to the electric water pump 86, when the advanced control for lowering the water temperature where the cooling water temperature T is made to fall in advance is stopped, is made to decrease to the target feed power corresponding to the operating state of the engine. In this case, in the same way, the feed power to the electric water pump 86 may also be returned to the feed power before the advanced control for lowering the water temperature where the cooling water temperature T is made to fall in advance is stopped.

Figure 16A:
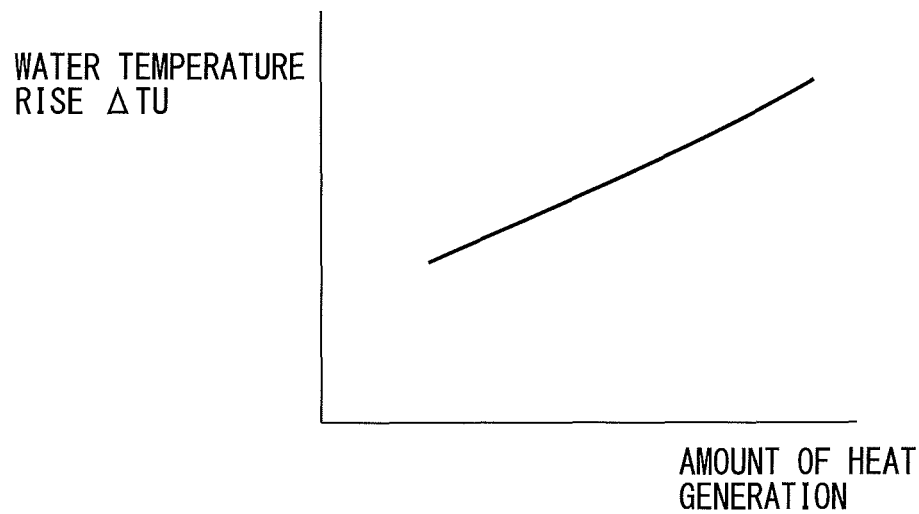
FIGS. 16A and 16B are views which respectively show the relationship between an amount of water temperature rise and an amount of heat generation and the relationship between an amount of water temperature fall and an amount of cooling.
Figure 16B:
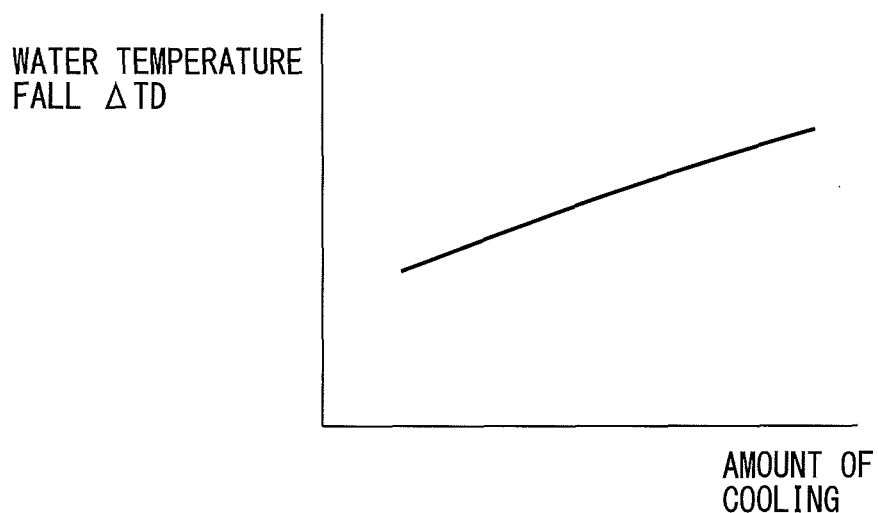

On the other hand, to prevent the engine cooling water from overheating when the road changes from a flat road to an upward slope and the load of the engine is made to increase, it is sufficient to make the cooling water temperature T when the load of the engine starts to be increased fall to a target temperature where even if the load of the engine is made to increase, the temperature will not exceed the upper limit value T2. This target temperature is shown by TX in FIG. 14 and FIG. 15. Next, the method of finding the target temperature TX will be explained briefly. If the engine generates heat, the cooling water temperature T will rise. The relationship between the amount of heat generation of the engine per unit time and the amount of rise ΔTU of the cooling water temperature T per unit time in this case is found and stored in advance, for example, as shown in FIG. 16A. Further, if the engine is cooled, the cooling water temperature T falls. The relationship between the amount of cooling of the engine per unit time and the amount of drop ΔTD of the cooling water temperature T per unit time in this case is found and stored in advance, for example, as shown in FIG. 16B.

In this case, the cooling water temperature T after a fixed time is found by continuing to add to the current cooling water temperature T the rise ΔTU of the cooling water temperature T until this fixed time elapses and continuing to subtract from the current cooling water temperature T the drop ΔTD of the cooling water temperature T until this fixed time elapses. In this embodiment according to an embodiment of the present invention, the amount of heat generation of the engine per unit time and the amount of cooling of the engine per unit time when the road changes from a flat road to an upward slope and the load of the engine is made to increase are predicted and, from the predicted amount of heat generation and predicted amount of cooling, a predicted change in water temperature when the load of the engine is made to increase is found. Next, the target temperature TX at the time of starting to increase the engine load is found. In this case, this target temperature TX is the cooling water temperature T which will not exceed the upper limit value T2 when the cooling water temperature T changes by this predicted change of water temperature.

Figure 17:
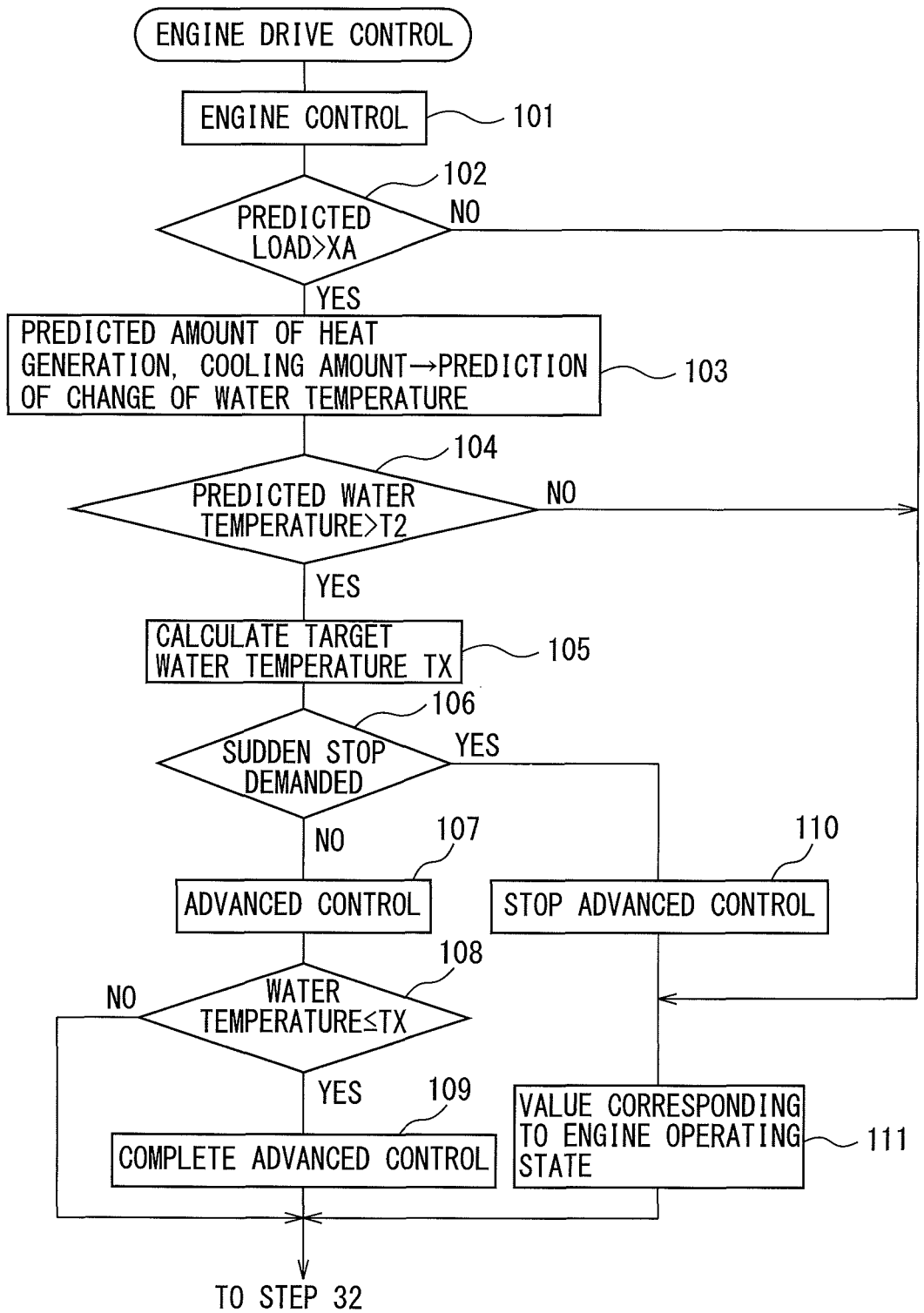
FIG. 17 is a flow chart for control of the drive operation of the engine.

FIG. 17 shows an engine drive control routine which is performed at step 31 after completion of processing performed at step 30 of FIG. 6 for working the embodiment according to an embodiment of the present invention which is shown in FIG. 15. Note that, as explained above, at step 30 of FIG. 6, the driving plan which is generated at step 52 of FIG. 9 and the driving stop plan which is generated at step 53 of FIG. 9 are acquired. Referring to FIG. 17, first, at step 101, the engine is controlled based on the driving plan and driving stop plan which were obtained at step 30 of FIG. 6. Specifically, the required drive torque TR giving the driving state (v) of the host vehicle V according to the driving plan or driving stop plan is calculated, and the engine load, i.e., the opening degree of the throttle valve 66 and the gear ratio of the transmission are controlled so that the drive torque with respect to the vehicle V becomes this required drive torque TR.

Next, at step 102, a change from a flat road to an upward slope and change of the engine load are predicted based on the position information of the vehicle V, map information of the map database 4, and driving state of the vehicle V and, it is judged if the predicted engine load will exceed a predetermined set value XA, for example, after a fixed time. When it is judged that the predicted engine load will not exceed the predetermined set value XA, that is, when the road will become a flat road or even if becoming an upward slope, will be gentle in slope after a fixed time, the routine proceeds to step 111 where the opening degree of the flow control valve 84 or the feed power to the electric water pump 86 is made an opening degree or feed power corresponding to the operating state of the engine. That is, the opening degree of the flow control valve 84 or the feed power to the electric water pump 86 is made the opening degree of the flow control valve 84 or the feed power to the electric water pump 86 at the time of normal engine operation when the advanced control of the opening degree of the flow control valve 84 or the feed power to the electric water pump 86 is not performed.

On the other hand, at step 102, when it is judged that the predicted engine load exceeds the predetermined set value XA, that is, when it is judged that the road will become a relatively steep upward slope after a fixed time, the routine proceeds to step 103 where the amount of heat generation of the engine per unit time and the amount of cooling of the engine per unit time when the road changes from a flat road to an upward slope and the load of the engine is made to increase are predicted, and from the predicted amount of heat generation and predicted amount of cooling, using the relationships which are shown in FIG. 16A and FIG. 16B, the change in water temperature when the load of the engine is made to increase is predicted. Next, at step 104, it is judged if, for example, the highest predicted water temperature in the predicted change in water temperature will exceed the upper limit value T2.

When it is judged that the highest predicted water temperature in the predicted change in water temperature will not exceed the upper limit value T2, that is, when even if the load of the engine is made to increase, the engine cooling water will not overheat and the cooling water temperature T in the engine body 60 will be maintained at the optimum temperature between the lower limit value T1 and the upper limit value T2, the routine proceeds to step 111 where the opening degree of the flow control valve 84 or the feed power to the electric water pump 86 is made an opening degree or feed power corresponding to the operating state of the engine. As opposed to this, when, at step 104, it is judged that the highest predicted water temperature in the predicted change in water temperature will exceed the upper limit value T2, the routine proceeds to step 105 where the target temperature TX at the time of start of increase of engine load is found. As mentioned previously, this target temperature TX is the cooling water temperature T which will not exceed the upper limit value T2 when the cooling water temperature T changes by the predicted change in water temperature.

Next, at step 106, it is judged if, for example, a pedestrian suddenly jumps out in front of the vehicle and thereby the demand for sudden stop of the vehicle is issued. When it is judged that the demand for sudden stop of the vehicle is not issued, the routine proceeds to step 107 where the advanced control for the opening degree of the flow control valve 84 or the feed power to the electric water pump 86 is started. That is, at this time, as shown in FIG. 14, the opening degree of the flow control valve 84 is made to decrease or the feed power to the electric water pump 86 is made to increase whereby the advanced control for lowering the water temperature where the cooling water temperature T is made to fall in advance is started. Next, at step 108, it is judged if cooling water temperature T becomes the target temperature TX or less. When the cooling water temperature T becomes the target temperature TX or less, the routine proceeds to step 109 where processing for decreasing the opening degree of the flow control valve 84 or processing for increasing the feed power to the electric water pump 86 is made to end.

On the other hand, when, at step 106, it is judged that the demand for sudden stop of the vehicle is issued, the routine proceeds to step 110 where the advanced control for the opening degree of the flow control valve 84 or the feed power to the electric water pump 86 is stopped. Next, the routine proceeds to step 111. Therefore, at this time, the opening degree of the flow control valve 84 is made to increase up to an opening degree corresponding to the operating state of the engine or the feed power to the electric water pump 86 is made to decrease to a feed power corresponding to the operating state of the engine.

In this way, in the embodiment shown in FIG. 15 to FIG. 17, the engine operation control device is comprised of a cooling water temperature control device for controlling the temperature of the cooling water of the engine. When it is predicted from the driving plan that a rise of the load of the engine will cause the temperature of the cooling water of the engine to exceed a predetermined target range, the advanced control for lowering the water temperature where the temperature of the cooling water of the engine is made to fall before the load of the engine rises is started, and when there is the demand for sudden stop of the vehicle, the advanced control for lowering the water temperature is stopped.

In this case, in the example which is shown in FIG. 11A, this cooling water temperature control device is comprised of the flow control valve 84 which controls the amount of engine cooling water fed from the inside of the engine body to the radiator 70, the control command value is the opening degree of the flow control valve 84, and the advanced control for lowering the water temperature is performed by controlling the opening degree of the flow control valve 84. On the other hand, in this case, in the example which is shown in FIG. 11B, this cooling water temperature control device is comprised of the electric water pump 86 which controls the amount of engine cooling water fed from the inside of the engine body to the radiator 70, the control command value is the feed power to the electric water pump 86, and the advanced control for lowering the water temperature is performed by controlling the feed power to the electric water pump 86.

Next, referring to FIG. 18, the case where currently the host vehicle V is being automatically driven on a flat road or an upward sloping road and soon the road will become a downward slope will be explained. This FIG. 18, like FIG. 14, shows the change of the load of the engine, the change of the opening degree of the flow control valve 84 shown in FIG. 11A, the change of the feed power to the electric water pump 86 shown in FIG. 11B, and the change of the cooling water temperature T in the engine body 60. Now then, if the road changes from a flat road or upward slope to a downward slope and the load of the engine is made to fall and thereby the fuel injection amount from the fuel injector 64 is made to decrease, the amount of heat generation in the combustion chamber 61 decreases, so the cooling water temperature T in the engine body 60 rapidly falls. Therefore, depending on the cooling water temperature T when the road changes to a downward slope and the load of the engine starts to be decreased, while the load of the engine is made to decrease, sometimes the cooling water temperature T will end up falling to the lower limit value T1 or less and the engine cooling water will end up becoming an overcooled state. In this case, to prevent the engine cooling water from becoming the overcooled state, it is sufficient to make the cooling water temperature T at the time of start of decrease of the engine load rise to the target temperature TY where even if the load of the engine decreases, the temperature will not become the lower limit value T1 or less.

Figure 18:
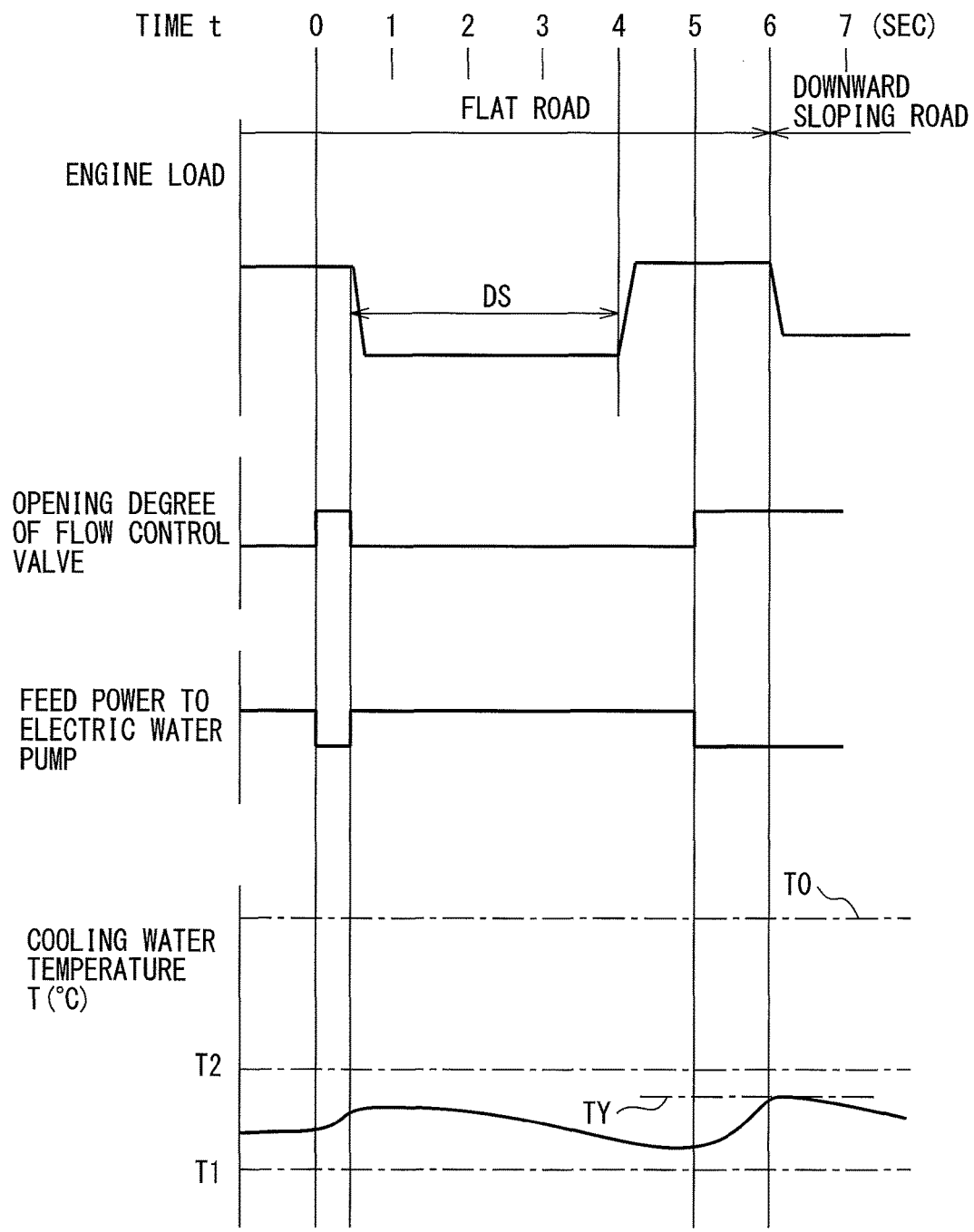
FIG. 18 is a time chart of control of the cooling water temperature of the engine according to the an embodiment of the present invention.

FIG. 18 shows the case where at the time t=0, it is predicted the road will change to a downward slope at the time t=1, but, after that, before the road changes to a downward slope, for example, a pedestrian suddenly jumps out in front of the vehicle, and thereby the demand for sudden stop DS of the vehicle is issued. In this case, at the time t=0, it is predicted that the load of the engine will start to be decreased, and therefore at the time t=0 before reaching the time t=1, the action of raising the cooling water temperature T is started. At this time, in the example which is shown in FIG. 11A, at the time t=0, the opening degree of the flow control valve 84 is made to increase whereby the action of raising the cooling water temperature T is started, while in the example which is shown in FIG. 11B, at the time t=0, the feed power to the electric water pump 86 is made to fall whereby the action of raising the cooling water temperature T is started.

Next, if the demand for sudden stop DS of the vehicle is issued, the engine load is made to rapidly fall. In this case, in the example which is shown in FIG. 18, as will be understood from the solid line, after the demand for sudden stop DS of the vehicle is issued and the vehicle is completely stopped or the vehicle is made to be driven at a low speed, normal automated driving is started at the time t=4. In this regard, when the demand for sudden stop DS of the vehicle is issued in this way, if continuing to make the opening degree of the flow control valve 84 increase or continuing to make the feed power to the electric water pump 86 fall, regardless of the engine load being low, the action of raising the cooling water temperature T is continued. As a result, a problem occurs in that the cooling water temperature T exceeds the upper limit value T2 and the engine cooling water is overheated.

Therefore, in an embodiment of the present invention, to prevent the engine cooling water from being overheated in this way, when the demand for sudden stop DS of the vehicle is issued, the advanced control for raising the water temperature where the cooling water temperature T is made to rise in advance is stopped. That is, in an embodiment of the present invention, as shown in FIG. 18, as soon as the demand for sudden stop DS of the vehicle is issued, the opening degree of the flow control valve 84 is lowered or the feed power to the electric water pump 86 is increased. If the advanced control for raising the water temperature where the cooling water temperature T is made to rise in advance is stopped in this way, as shown in FIG. 18, the cooling water temperature T inside the engine body 60 is maintained at the optimum temperature between the lower limit value T1 and the upper limit value T2 and the engine cooling water can be prevented from being overheated.

The opening degree of the flow control valve 84 when the advanced control for raising the water temperature where the cooling water temperature T is made to rise in advance is stopped is made to decrease down to a target opening degree corresponding to the operating state of the engine. In this case, the opening degree of the flow control valve 84 can be made to return to the opening degree before the advanced control for raising the cooling water temperature where the cooling water temperature T is made to rise in advance was stopped. Further, the feed power to the electric water pump 86 when the advanced control for raising the cooling water temperature where the cooling water temperature T is made to rise in advance is stopped is made to increase up to the target feed power corresponding to the operating state of the engine. In this case, in the same way, the feed power to the electric water pump 86 can be returned to the feed power before the advanced control for raising the cooling water temperature where the cooling water temperature T is made to rise in advance is stopped.

Figure 19:
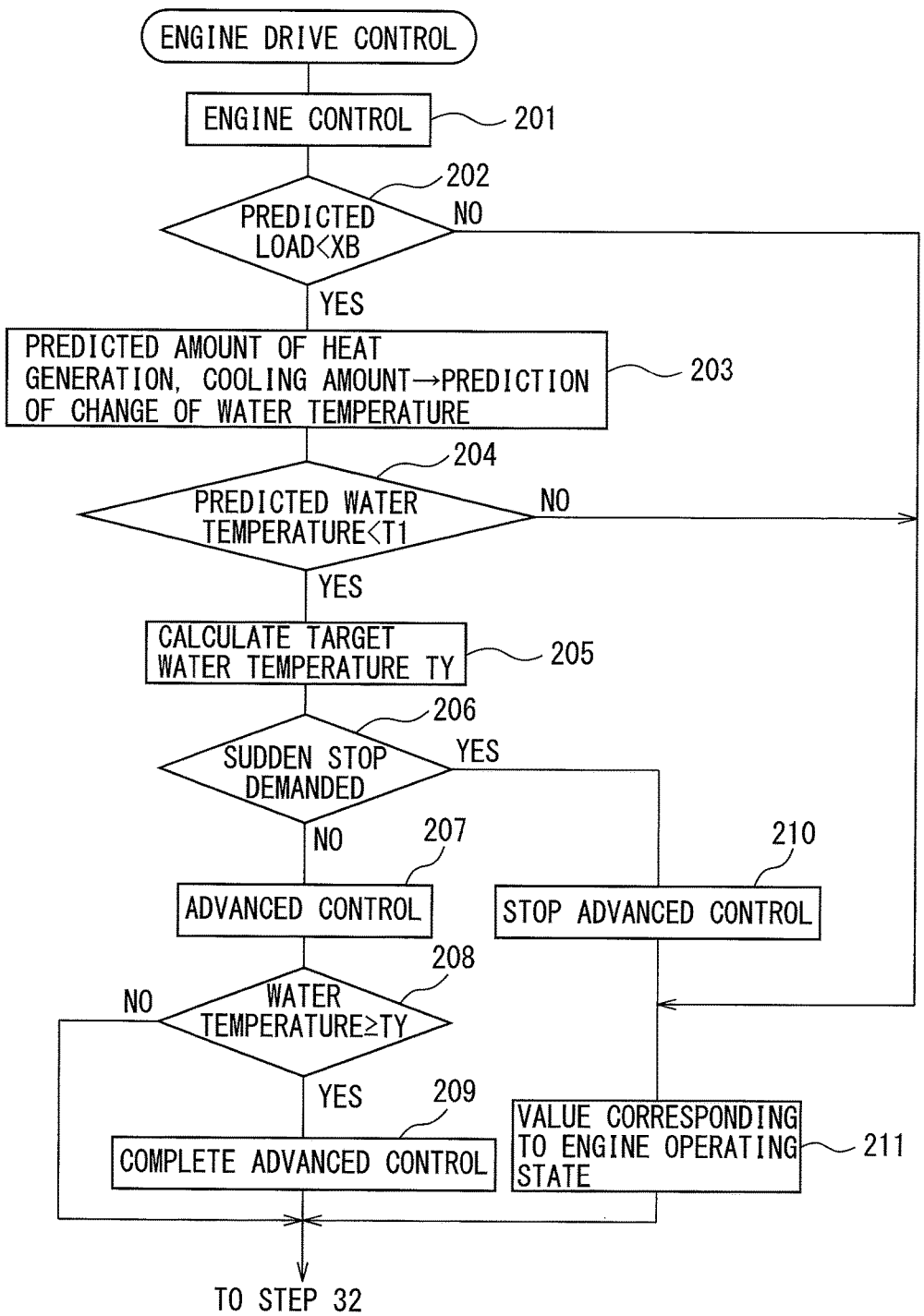
FIG. 19 is a flow chart for control of the drive operation of the engine.

FIG. 19 shows an engine drive control routine which is performed at step 31 of FIG. 6 for working the embodiment according to an embodiment of the present invention which is shown in FIG. 18. Note that, at step 31 of FIG. 6, during an automated driving operation, both engine drive control based on the engine drive control routine shown in FIG. 17 and engine drive control based on the engine drive control routine shown in FIG. 19 are performed. Referring to FIG. 19, first, at step 201, the engine is controlled based on the driving plan and driving stop plan which were obtained at step 30 of FIG. 6. Specifically, the required drive torque TR giving the driving state (v) of the host vehicle V according to the driving plan or driving stop plan is calculated, and the engine load, i.e., the opening degree of the throttle valve 66 and the gear ratio of the transmission are controlled so that the drive torque with respect to the vehicle V becomes this required drive torque TR.

Next, at step 202, a change from a flat road or upward slope to a downward slope and a change of the engine load are predicted based on the position information of the vehicle V, map information of the map database 4, and driving state of the vehicle V, and it is judged if the predicted engine load will become less than a predetermined set value XB which is lower than the current engine load, for example, after a fixed time. When it is judged that the predicted engine load will not become less than the predetermined set value XB, that is, when the road will be a flat road or upward slope or even if a downward slope, will be gentle in slope after a fixed time, the routine proceeds to step 211 where the opening degree of the flow control valve 84 or the feed power to the electric water pump 86 is made an opening degree or feed power corresponding to the operating state of the engine. That is, the opening degree of the flow control valve 84 or the feed power to the electric water pump 86 is made the opening degree of the flow control valve 84 or the feed power to the electric water pump 86 at the time of normal engine operation when the advanced control for the opening degree of the flow control valve 84 or the feed power to the electric water pump 86 is not being performed.

On the other hand, at step 202, when it is judged that the predicted engine load becomes less than the predetermined set value XB, that is, when it is judged that the road will become a relatively steep downward slope after a fixed time, the routine proceeds to step 203 where the amount of heat generation of the engine per unit time and the amount of cooling of the engine per unit time when the road changes to a downward slope and the load of the engine is made to fall are predicted, and from the predicted amount of heat generation and predicted amount of cooling, using the relationships which are shown in FIG. 16A and FIG. 16B, the change in water temperature when the load of the engine is made to fall is predicted. Next, at step 204, it is judged if, for example, the lowest predicted water temperature in this predicted change of water temperature will become less than the lower limit value T1 which is shown in FIG. 18.

When it is judged that the lowest predicted water temperature at the predicted change of water temperature will not become less than the lower limit value T1, that is, when the engine cooling water does not become an overcooled state and the cooling water temperature T in the engine body 60 is maintained at the optimum temperature between the lower limit value T1 and the upper limit value T2 even if the load of the engine is made to fall, the routine proceeds to step 211 where the opening degree of the flow control valve 84 or the feed power to the electric water pump 86 is made an opening degree or feed power corresponding to the operating state of the engine. As opposed to this, when, at step 204, it is judged that the lowest predicted water temperature at the predicted change of water temperature becomes less than the lower limit value T1, the routine proceeds to step 205 where the target temperature TY at the time of start of fall of the engine load is found. In this case, this target temperature TY is the cooling water temperature T which will not become less than the lower limit value T1 when the cooling water temperature T changes by this predicted change of water temperature.

Next, at step 206, it is judged if, for example, a pedestrian suddenly jumps out in front of the vehicle and thereby the demand for sudden stop of the vehicle is issued. When it is judged that the demand for sudden stop of the vehicle is not issued, the routine proceeds to step 207 where the advanced control of the opening degree of the flow control valve 84 or the feed power to the electric water pump 86 is started. That is, at this time, as shown in FIG. 18, the opening degree of the flow control valve 84 is made to increase or the feed power to the electric water pump 86 is made to decrease, whereby the advanced control for raising the water temperature where the cooling water temperature T is made to rise in advance is started. Next, at step 208, it is judged if the cooling water temperature T becomes the target temperature TY or more. When the cooling water temperature T becomes the target temperature TY or more, the routine proceeds to step 209 where processing for increasing the opening degree of the flow control valve 84 or processing for decreasing the feed power to the electric water pump 86 is made to end.

On the other hand, when, at step 206, it is judged that the demand for sudden stop of the vehicle is issued, the routine proceeds to step 210 where the advanced control for the opening degree of the flow control valve 84 or the feed power to the electric water pump 86 is stopped. Next, the routine proceeds to step 211. Therefore, at this time, the opening degree of the flow control valve 84 is made to decrease to an opening degree corresponding to the operating state of the engine or the feed power to the electric water pump 86 is made to increase up to the feed power corresponding to the operating state of the engine.

In this way, in the embodiment which is shown in FIG. 18 and FIG. 19, the engine operation control device is comprised of a cooling water temperature control device for controlling the temperature of the cooling water of the engine. When it is predicted from the driving plan that a drop in the load of the engine will cause the temperature of the cooling water of the engine to become a predetermined target range or less, the advanced control for raising the water temperature where the temperature of the cooling water of the engine is made to rise before the load of the engine falls is started, and when there is the demand for sudden stop of the vehicle, the advanced control for raising the water temperature is stopped.

In this case, in the example which is shown in FIG. 11A, this cooling water temperature control device is comprised of the flow control valve 84 which controls the amount of engine cooling water fed from the inside of the engine body to the radiator 70, the control command value is the opening degree of the flow control valve 84, and the advanced control for raising the water temperature is performed by controlling the opening degree of the flow control valve 84. On the other hand, in this case, in the example which is shown in FIG. 11B, this cooling water temperature control device is comprised of the electric water pump 86 which controls the amount of engine cooling water fed from the inside of the engine body to the radiator 70, the control command value is the feed power to the electric water pump 86, and the advanced control for raising the water temperature is performed by controlling the feed power to the electric water pump 86.

Figure 20:
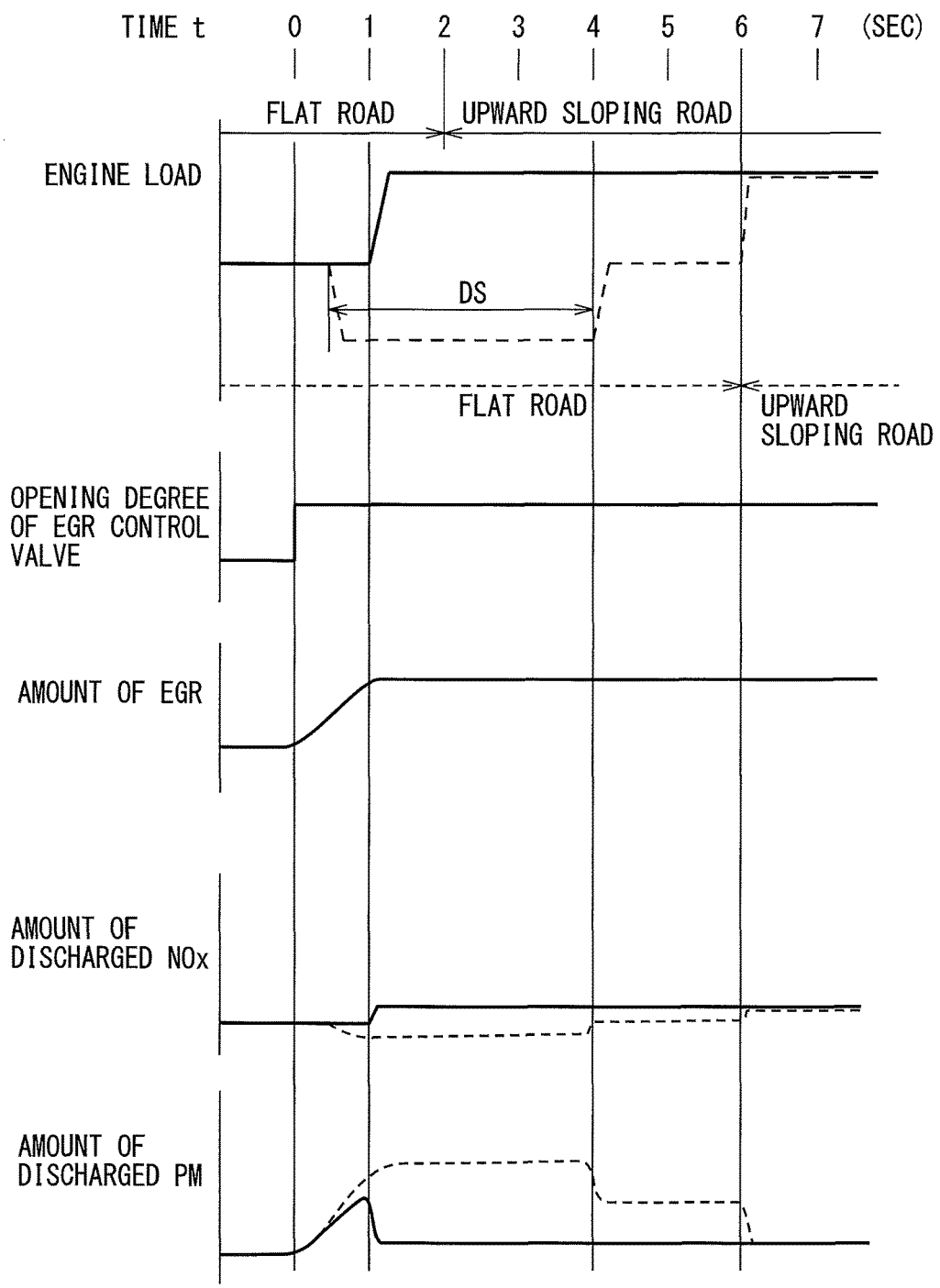
FIG. 20 is a time chart of EGR control of an engine according to an embodiment of the present invention.

FIG. 20 shows a time chart in the case where the control subject which is controlled in advance in the operating control of an engine according to an embodiment of the present invention is the amount of exhaust gas which is recirculated from the inside of the exhaust manifold 63 to the inside of the intake manifold 62 (below, referred to as the "EGR amount"). In this FIG. 20, the change of the load of the engine, the change of the opening degree of the EGR control valve 73 shown in FIG. 10, the change of the EGR amount, the change of the amount of discharged $NO_X$ which is discharged from the engine, and the change of the amount of particulate which is discharged from the engine, that is, the amount of discharged PM are shown. Note that, in the example which is shown in FIG. 20, the engine operation control device which is controlled in advance is comprised of the EGR control valve 73, and the control command value of the engine operation control device which is controlled in advance is the opening degree of the EGR control valve 73.

Now then, if the road changes from a flat road to an upward slope, as shown in FIG. 20, the load of the engine is made to increase and the fuel injection amount from the fuel injector 64 is made to increase. As a result, the combustion temperature in the combustion chamber 61 becomes higher. If the combustion temperature in the combustion chamber 61 becomes higher, the amount of generation of $NO_X$ in the combustion chamber 61 increases and, as a result, the amount of discharged $NO_X$ increases. In this case, to make the amount of discharged $NO_X$ decrease, it is sufficient to make the combustion temperature in the combustion chamber 61 fall. For that, it is sufficient to make the EGR amount increase.

However, time is required for making the EGR amount increase. Therefore, the action of increasing the EGR amount has to be made to start before the road changes from a flat road to an upward slope and the load of the engine starts to be increased. In this case, in the automated driving system of a vehicle which is used in an embodiment of the present invention, a change of the road from a flat road to an upward slope can be predicted from the position information of the vehicle V, map information of the map database 4, and driving state of the vehicle V. Therefore, in an embodiment of the present invention, the action of increasing the EGR amount is made to start in advance before the road changes from a flat road to an upward slope and the load of the engine starts to be increased.

The solid line of FIG. 20 shows the case where, at the time t=1, the road changes from a flat road to an upward slope, therefore, at the time t=1, the load of the engine starts to be increased. Further, FIG. 20 shows the case where, at the time t=0, it is predicted that the load of the engine will start to be increased at the time t=1, and thereby the action of increasing the EGR amount is started at the time t=0 before reaching the time t=1. In this case, as shown in FIG. 20, by making the opening degree of the EGR control valve 73 increase, the EGR amount is increased. If the opening degree of the EGR control valve 73 is increased, as shown in FIG. 20, the EGR amount is made to gradually increase. As shown in FIG. 20, even if the load of the engine is made to increase, the amount of discharged $NO_X$ is maintained at a low value.

On the other hand, when the load of the engine is low, that is, when the combustion temperature inside a combustion chamber 61 is low, if the EGR amount is made to increase, the combustion deteriorates, so the amount of production of soot inside the combustion chamber 61 increases and, as a result, as shown in FIG. 20, the amount of discharged PM increases. Note that, if the load of the engine becomes higher, the combustion temperature in the combustion chamber 61 becomes higher, so even if the EGR amount is made to increase, the combustion does not deteriorate and, therefore, as shown in FIG. 20, the amount of discharged PM becomes smaller.

On the other hand, the broken line in FIG. 20 shows the case where the action of increasing the EGR amount is started and then before the road changes from a flat road to an upward slope, for example, a pedestrian suddenly jumps out in front of the vehicle and causes the demand for sudden stop DS of the vehicle to be issued. As will be understood from the broken line in FIG. 20, if the demand for sudden stop DS of the vehicle is issued, the engine load is made to rapidly fall. In this case, sometimes the vehicle is completely stopped in accordance with the driving stop plan and sometimes the vehicle is made to rapidly decelerate, then is made to be driven at a low speed. In the example which is shown in FIG. 20, as will be understood from the broken line, the demand for sudden stop DS of the vehicle is issued and the vehicle is completely stopped or the vehicle is made to be driven at a low speed, then at the time t=4, normal automated driving is started.

In this regard, when the demand for sudden stop DS of the vehicle is issued in this way, as shown by the solid line in FIG. 20, if continuing to make the opening degree of the EGR control valve 73 increase, regardless of the engine load being low, a large amount of EGR gas is made to recirculate. As a result of this, the combustion deteriorates and, as shown by the broken line in FIG. 20, the amount of discharged PM greatly increases. Therefore, in an embodiment of the present invention, to prevent the amount of discharged PM from greatly increasing in this way, when the demand for sudden stop DS of the vehicle is issued, the advanced control for increasing the EGR amount where the EGR amount is made to increase in advance is stopped. Next, this will be explained with reference to FIG. 21 which shows the change of the load of the engine, the change of the opening degree of the EGR control valve 73, the change of the EGR amount, the change of the amount of discharged $NO_X$, and the change of the amount of discharged PM in the same way as FIG. 20.

Figure 21:
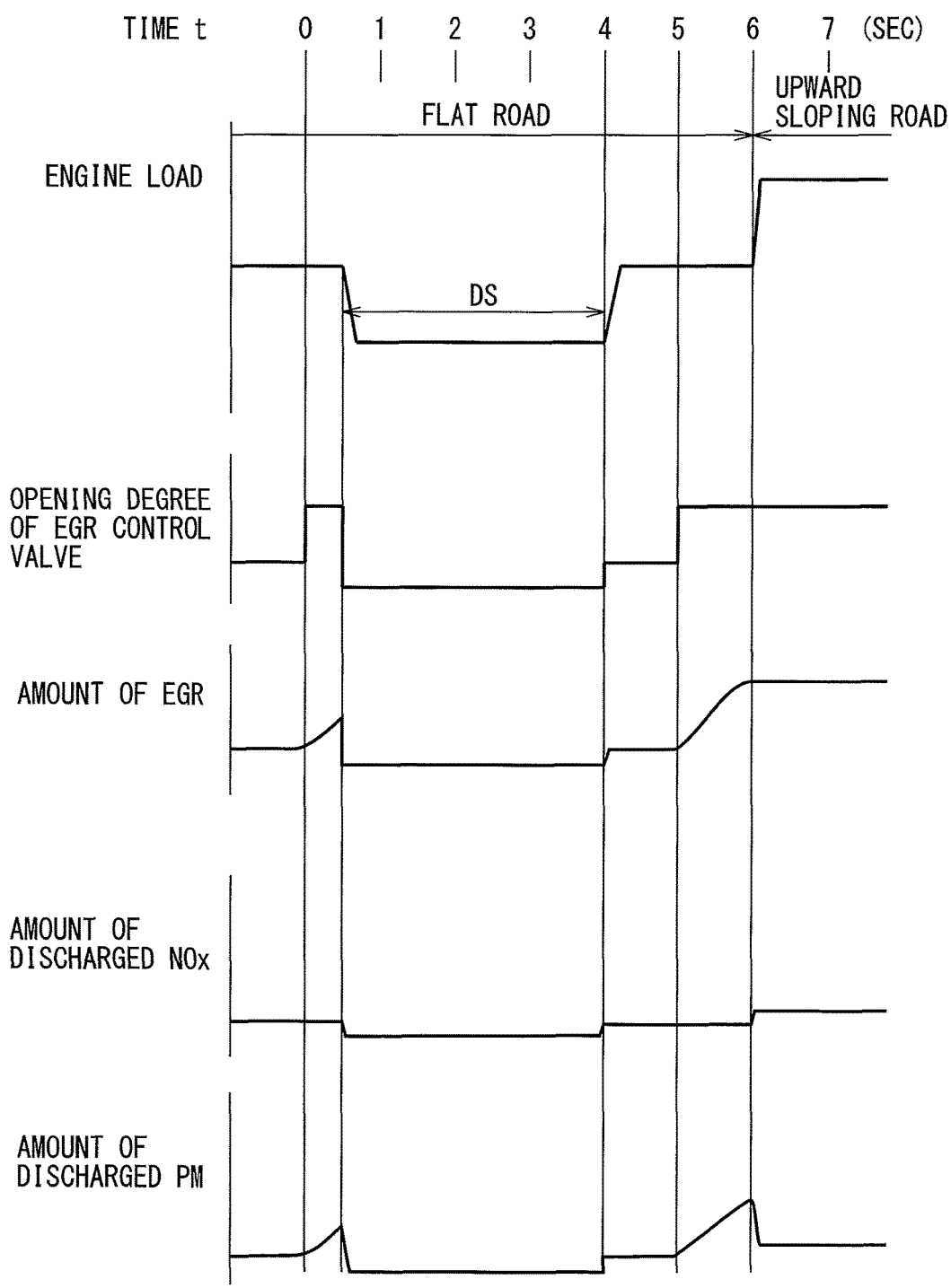
FIG. 21 is a time chart of EGR control of an engine according to an embodiment of the present invention.

FIG. 21 shows the case where it is predicted that the road will change from a flat road to an upward slope, so at time t=0, the opening degree of the EGR control valve 73 is increased and, after that, before the road changes from a flat road to an upward slope, the demand for sudden stop DS of the vehicle is issued. In this case, in an embodiment of the present invention, as shown in FIG. 21, as soon as the demand for sudden stop DS of the vehicle is issued, the opening degree of the EGR control valve 73 is decreased. That is, the advanced control for increasing the EGR amount where the EGR amount is made to increase in advance is stopped. In this way, if the advanced control for increasing the EGR amount where the EGR amount is made to increase in advance is stopped, as shown in FIG. 21, the amount of discharged PM is maintained at a low value. Note that, the opening degree of the EGR control valve 73 when the advanced control for increasing the EGR amount where the EGR amount is made to increase in advance is stopped is made to decrease down to a target opening degree corresponding to the operating state of the engine. In this case, the opening degree of the EGR control valve 73 can be made to return to the opening degree before the advanced control for increasing the EGR amount where the EGR amount is made to increase in advance is stopped.

Figure 22:
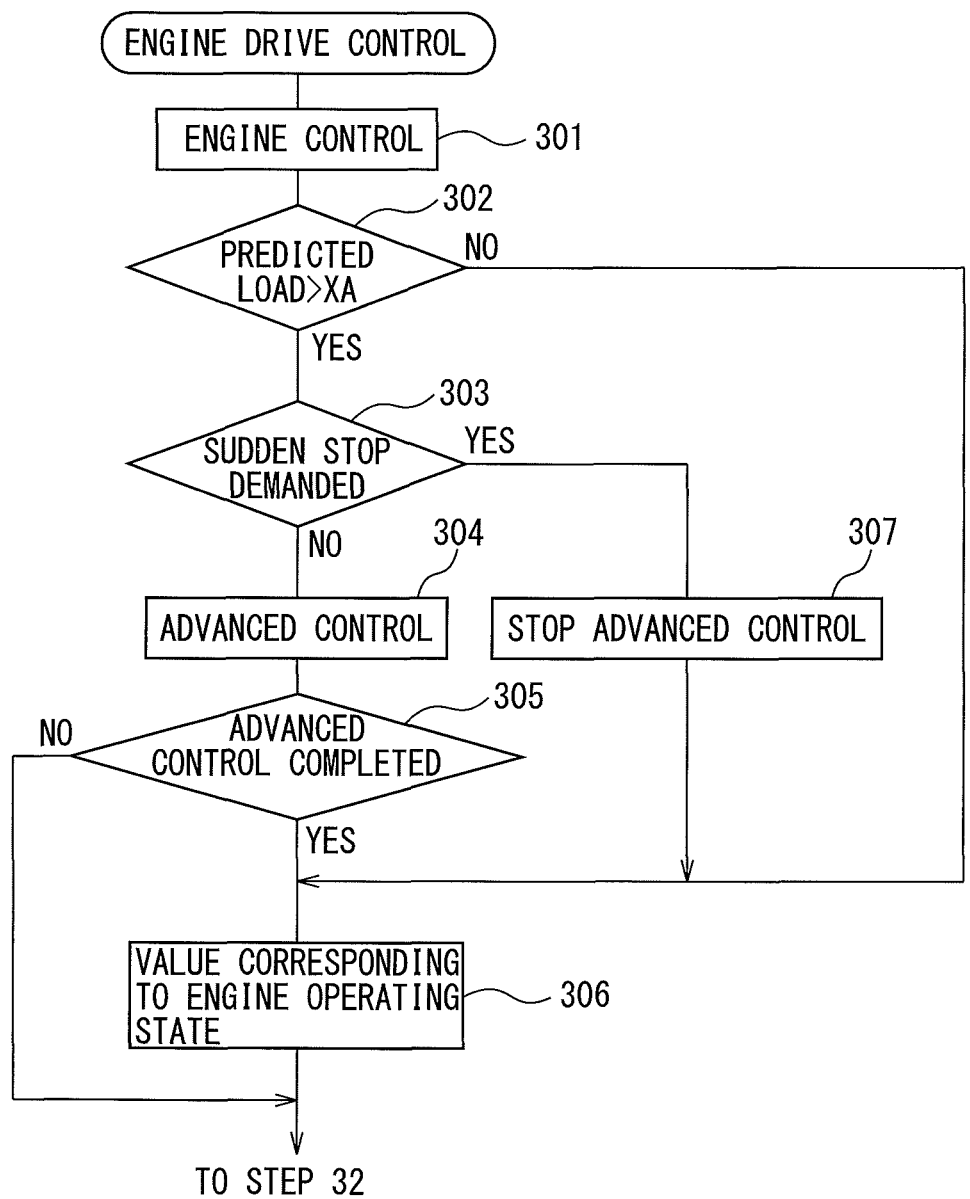
FIG. 22 is a flow chart for control of the drive operation of the engine.

FIG. 22 shows an engine drive control routine which is performed at step 31 of FIG. 6 for working this embodiment of the present invention which is shown in FIG. 21. If referring to FIG. 22, first, at step 301, the engine is controlled based on the driving plan and driving stop plan which were acquired at step 30 of FIG. 6. Specifically, the required drive torque TR giving the driving state (v) of the host vehicle V according to the driving plan or driving stop plan is calculated, and the engine load, that is, the opening degree of the throttle valve 66 and the gear ratio of the transmission, are controlled so that the drive torque for the vehicle V becomes this required drive torque TR.

Next, at step 302, a change from a flat road to an upward slope and a change of the engine load are predicted from the position information of the vehicle V, map information of the map database 4, and driving state of the vehicle V, and it is judged if the predicted engine load will exceed a predetermined set value XA, for example, after a fixed time. When it is judged that the predicted engine load will not exceed the predetermined set value XA, that is, when the road will be a flat road or is gentle even if the road will be an upward slope after a fixed time, the routine proceeds to step 306 where the opening degree of the EGR control valve 73 is made an opening degree corresponding to the operating state of the engine. That is, the opening degree of the EGR control valve 73 is made the opening degree of the EGR control valve 73 at the time of normal engine operation when the advanced control is not being performed for the opening degree of the EGR control valve 73.

On the other hand, when it is judged at step 302 that the predicted engine load exceeds the predetermined set value XA, that is, when it is judged that the road will become a relatively steep upward slope after a fixed time, the routine proceeds to step 303 where it is judged that, for example, a pedestrian suddenly jumps out in front of the vehicle and causes the demand for sudden stop of the vehicle to be issued. When it is judged that the demand for sudden stop of the vehicle is not issued, the routine proceeds to step 304 where the advanced control for the opening degree of the EGR control valve 73 is started. That is, at this time, as shown in FIG. 21, the opening degree of the EGR control valve 73 is made to increase whereby the advanced control for increasing the EGR amount where the EGR amount is made to increase in advance is started.

Next, at step 305, it is judged if the advanced control for increasing the EGR amount where the EGR amount is made to increase in advance is completed, that is, if the opening degree of the EGR control valve 73 becomes an opening degree corresponding to the predicted operating state of the engine. When it is judged that the opening degree of the EGR control valve 73 becomes an opening degree corresponding to the predicted operating state of the engine, the routine proceeds to step 306 where the opening degree of the EGR control valve 73 is made an opening degree corresponding to the operating state of the engine. On the other hand, when, at step 303, it is judged that the demand for sudden stop of the vehicle is issued, the routine proceeds to step 307 where the advanced control for increasing the EGR amount where the EGR amount is made to increase in advance is stopped. Next, the routine proceeds to step 306 where the opening degree of the EGR control valve 73 is made to decrease until an opening degree corresponding to the operating state of the engine.

In this way, in the embodiment which is shown in FIG. 21 and FIG. 22, the engine operation control device is comprised of an exhaust gas recirculation flow control device which controls the amount of exhaust gas recirculation flow of an engine. When a rise of the load of the engine is predicted from the driving plan, the advanced control for increasing the recirculation exhaust gas flow amount is started to make the exhaust gas recirculation flow increase before the load of the engine rises, and when there is the demand for sudden stop of the vehicle, the advanced control for increasing the recirculation exhaust gas flow amount is stopped. In this case, as shown in FIG. 10, the exhaust gas recirculation flow control device is comprised of the exhaust gas recirculation control valve 73 which is arranged in the exhaust gas recirculation passage 72 of the engine, the control command value is an opening degree of the exhaust gas recirculation control valve 73, and the advanced control for increasing the recirculation flow is performed by controlling the opening degree of the exhaust gas recirculation control valve 73.

Next, while referring to FIG. 23, the case where the host vehicle V is currently being automatically driven on a flat road or road of an upward slope and the road will soon become a downward slope will be explained. This FIG. 23, like FIG. 21, shows the change of the load of the engine, the change of the opening degree of the EGR control valve 73, the change of the EGR amount, the change of the amount of discharged $NO_X$, and the change of the amount of discharged PM. Now, if the road changes from a flat road or an upward slope to a downward slope, the load of the engine is made to fall and the fuel injection amount from the fuel injector 64 is made to decrease. As a result, the combustion temperature in the combustion chamber 61 falls. If the combustion temperature in the combustion chamber 61 becomes lower, the amount of generation of $NO_X$ in the combustion chamber 61 will decrease, so there will no longer be a need to cause a large amount of EGR gas to recirculate. On the other hand, at this time, if the amount of recirculation of EGR gas is great, the combustion will deteriorate. As a result, the amount of discharged PM will increase. Therefore, when it is predicted that the road will change to a downward slope, the EGR amount has to be made to decrease.

Figure 23:
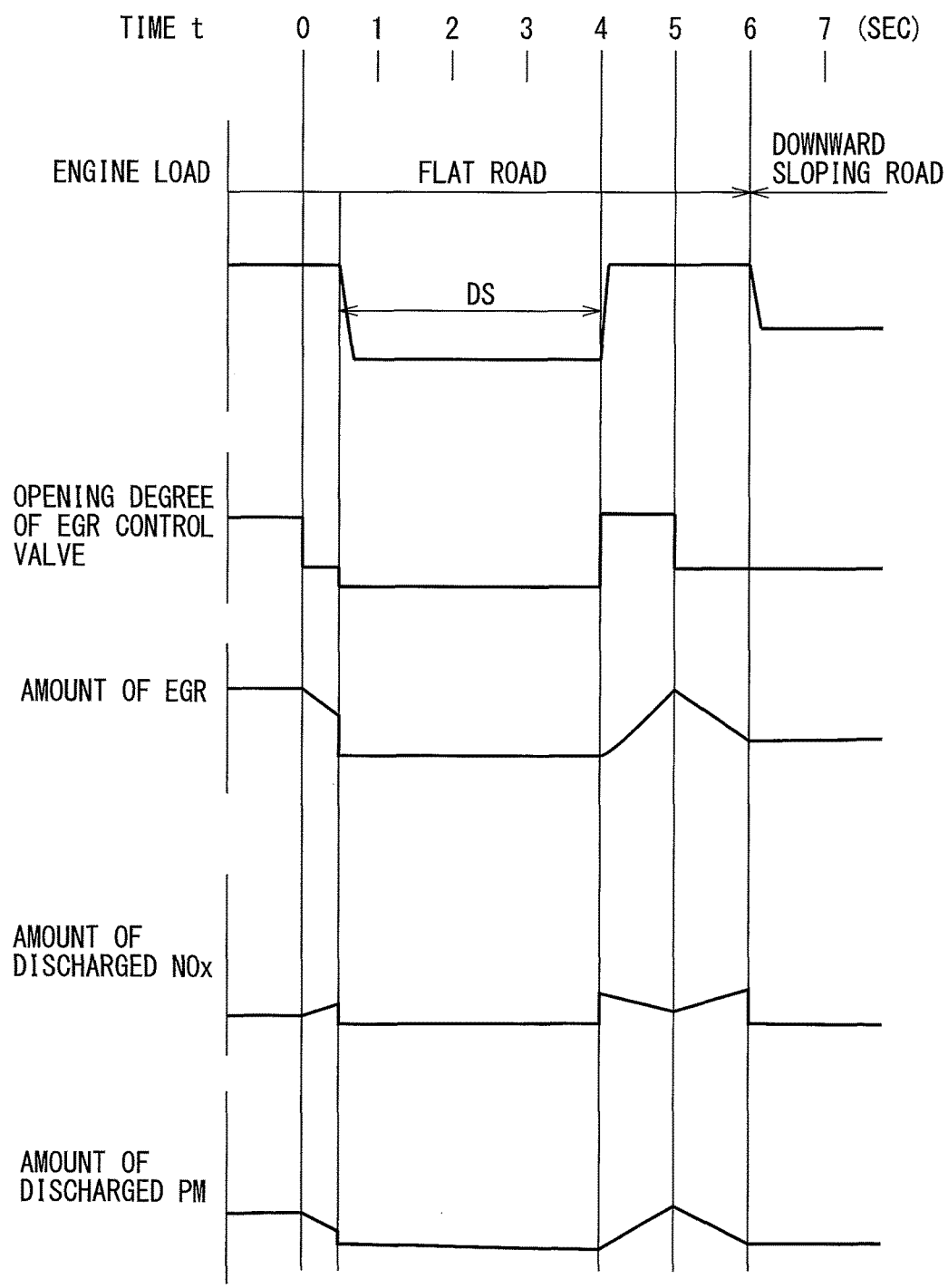
FIG. 23 is a time chart of EGR control of an engine according to an embodiment of the present invention.

FIG. 23 shows the case where it is predicted that the road will change to a downward slope at the time t=1, but, after that, before the road changes to a downward slope, for example, a pedestrian suddenly jumps out in front of the vehicle and causes the demand for sudden stop DS of the vehicle to be issued. In this case, it is predicted that the load of the engine will start to be decreased, so at the time t=0 before reaching the time t=1, the action of decreasing the EGR amount is started. At this time, as shown in FIG. 23, at the time t=0, the opening degree of the EGR control valve 73 is decreased and the action of decreasing the EGR amount is started.

Next, if the demand for sudden stop DS of the vehicle is issued, the engine load is made to rapidly fall. In this case, in the example which is shown in FIG. 23, the demand for sudden stop DS of the vehicle is issued and the vehicle is completely stopped or the vehicle is driven at a low speed, then at the time t=4, normal automated driving is started. In this regard, when the demand for sudden stop DS of the vehicle is issued in this way, if the recirculation of the EGR is great, the amount of discharged PM becomes greater.

Therefore, in an embodiment of the present invention, to prevent the amount of discharged PM from becoming greater in this way, when the demand for sudden stop DS of the vehicle is issued, the advanced control for decreasing the EGR amount where the EGR amount is made to decrease in advance is stopped. That is, in an embodiment of the present invention, as shown in FIG. 23, as soon as the demand for sudden stop DS of the vehicle is issued, the opening degree of the EGR control valve 73 is made to further fall. In this way, if the advanced control for decreasing the EGR amount where the EGR amount is made to decrease in advance is stopped, as shown in FIG. 23, the amount of discharged PM is greatly decreased. Note that, the opening degree of the EGR control valve 73 when the advanced control for decreasing the EGR amount where the EGR amount is made to decrease in advance is stopped is made to decrease to a target opening degree corresponding to the operating state of the engine.

FIG. 24 shows an engine drive control routine which is performed at step 31 of FIG. 6 for working the embodiment according to an embodiment of the present invention which is shown in FIG. 23. Referring to FIG. 24, first, at step 401, the engine is controlled based on the driving plan and driving stop plan which were obtained at step 30 of FIG. 6. Specifically, the required drive torque TR giving the driving state (v) of the host vehicle V according to these driving plan or driving stop plan is calculated, and the engine load, that is, the opening degree of the throttle valve 66 and the gear ratio of the transmission are controlled so that the drive torque with respect to the vehicle V becomes this required drive torque TR.

Next, at step 402, a change from a flat road or upward slope to a downward slope and change of the engine load is predicted from the position information of the vehicle V, map information of the map database 4, and driving state of the vehicle V, and it is judged if the predicted load will become less than a predetermined set value XB which is lower than the current engine load, for example, after a fixed time. When it is judged that the predicted engine load will not become the predetermined set value XB or less, that is, when the road will be a flat road or an upward slope or even if a downward slope, a gentle slope after a fixed time, the routine proceeds to step 406 where the opening degree of the EGR control valve 73 is made an opening degree corresponding to the operating state of the engine. That is, the opening degree of the EGR control valve 73 is made the opening degree of the EGR control valve 73 at the time of normal engine operation where the advanced control of the opening degree of the EGR control valve 73 is not performed.

On the other hand, at step 402, when it is judged that the predicted engine load becomes the predetermined set value XB or less, that is, when it is judged that the road will become a relatively steep downward slope after a fixed time, the routine proceeds to step 403 where it is judged if, for example, a pedestrian suddenly jumps out in front of the vehicle and causes the demand for sudden stop of the vehicle to be issued. When it is judged that the demand for sudden stop of the vehicle is not issued, the routine proceeds to step 404 where the advanced control for the opening degree of the EGR control valve 73 is started. That is, at this time, as shown in FIG. 23, the opening degree of the EGR control valve 73 is made to decrease, and the advanced control for decreasing the EGR amount where the EGR amount is made to decrease in advance is started.

Next, at step 405, it is judged if the advanced control for decreasing the EGR amount where the EGR amount is made to decrease in advance is completed, that is, if the opening degree of the EGR control valve 73 becomes an opening degree corresponding to the predicted operating state of the engine. When the opening degree of the EGR control valve 73 becomes an opening degree corresponding to the predicted operating state of the engine, the routine proceeds to step 406 where the opening degree of the EGR control valve 73 is made an opening degree corresponding to the operating state of the engine. On the other hand, when, at step 403, it is judged that the demand for sudden stop of the vehicle is issued, the routine proceeds to step 407 where the advanced control for decreasing the EGR amount where the EGR amount is made to decrease in advance is stopped. Next, the routine proceeds to step 406 where the opening degree of the EGR control valve 73 is made to further decrease down to an opening degree corresponding to the operating state of the engine.

In this way, in the embodiment which is shown in FIG. 23 and FIG. 24, the engine operation control device is comprised of an exhaust gas recirculation flow control device which controls the amount of exhaust gas recirculation flow of the engine. When a fall of the load of the engine is predicted from the driving plan, the advanced control for lowering the recirculation exhaust gas flow amount where the amount of exhaust gas recirculation flow is made to decrease is started from before the load of the engine falls, and, when there is the demand for sudden stop of the vehicle, the advanced control for lowering the recirculation exhaust gas flow amount is stopped. In this case, as shown in FIG. 10, the exhaust gas recirculation flow control device is comprised of the exhaust gas recirculation control valve 73 which is arranged in the exhaust gas recirculation passage 72 of the engine, the control command value is an opening degree of the exhaust gas recirculation control valve 73, and the advanced control for lowering the recirculation exhaust gas flow amount is performed by controlling the opening degree of the exhaust gas recirculation control valve 73.

FIG. 25 and FIG. 26 show time charts in the case where the subject of control of the advanced control in the operating control of an engine according to an embodiment of the present invention is the EGR gas temperature and the supercharging pressure. Note that, these FIG. 25 and FIG. 26 show the change of the load of the engine, the change of the opening degree of the bypass valve 90 to the EGR cooler 74 side of the EGR cooler 74 shown in FIG. 12, the change of degree of the nozzle opening which is formed between movable vanes 93 of the variable nozzle type exhaust turbine 68b shown in FIG. 13A, and the change of the feed power to the electric motor 96 of the electric turbocharger shown in FIG. 13B.

Now, if the road changes from a flat road to an upward slope, the load of the engine is made to increase. As a result of this, the combustion temperature inside the combustion chamber 61 becomes higher, and thereby, as explained above, the amount of discharged $NO_X$ increases. In this case, to make the amount of discharged $NO_X$ decrease, it is sufficient to make the combustion temperature in the combustion chamber 61 to fall. To this end, it is sufficient to raise the cooling degree of the EGR gas and make the EGR gas temperature fall. In this case, if making the opening degree of the bypass valve 90 to the EGR cooler 74 side larger, the amount of the engine cooling water fed to the inside of the EGR cooler 74 is increased. Therefore, the cooling degree of the EGR gas is raised, and thereby the EGR gas temperature can be made to fall.

However, time is required for raising the cooling degree of EGR gas to cause the EGR gas temperature to fall. Therefore, in an embodiment of the present invention, the opening degree of the bypass valve 90 of the EGR cooler 74 to the EGR cooler 74 side is made larger before the road changes from a flat road to an upward slope and the load of the engine starts to be increased. In this case, the engine operation control device which is controlled in advance is the bypass valve 90 of the EGR cooler 74, and the control command value of the engine operation control device which is controlled in advance is the opening degree of the bypass valve 90 of the EGR cooler 74 to the EGR cooler 74 side.

Now, FIG. 25 shows the case where it is predicted that the road will change from a flat road to an upward slope, so at the time t=0, the opening degree of the bypass valve 90 of the EGR cooler 74 to the EGR cooler 74 side is increased and, after that, before the road changes from a flat road to an upward slope, the demand for sudden stop DS of the vehicle is issued. In this case, in an embodiment of the present invention, as shown in FIG. 25, as soon as the demand for sudden stop DS of the vehicle is issued, the opening degree of the bypass valve 90 of the EGR cooler 74 to the EGR cooler 74 side is decreased. That is, the advanced control for lowering the EGR gas temperature where the EGR gas temperature is made to fall in advance is stopped. In this way, if the advanced control for lowering the EGR gas temperature where the EGR gas temperature is made to fall in advance is stopped, in the same way as when the above-mentioned advanced control for increasing the EGR amount where the EGR amount is made to increase in advance is stopped, the amount of discharged PM is maintained at a low value. Note that, the opening degree of the EGR control valve 73 when the advanced control for lowering the EGR gas temperature where the EGR gas temperature is made to fall in advance is stopped is made to decrease down to a target opening degree corresponding to the operating state of the engine.

In this way, in the embodiment which is shown in FIG. 15, the engine operation control device is comprised of a cooling water flow control device which controls the amount of flow of the cooling water of the exhaust gas recirculation cooling device 74 of the engine. When it is predicted from the driving plan that the load of the engine will rise, the advanced control for lowering the exhaust gas recirculation temperature where the amount of flow of cooling water of the exhaust gas recirculation cooling device 74 is increased is started from before the load of the engine rises, and, when there is the demand for sudden stop of the vehicle, the advanced control for lowering the exhaust gas recirculation temperature is stopped. In this case, in the example which is shown in FIG. 12, the cooling water flow control device is comprised of the bypass valve 90 which controls the amount of engine cooling water fed from the inside of the engine body to the exhaust gas recirculation cooling device 74, the control command value is an opening degree of the bypass valve 90 to the exhaust gas recirculation cooling device 74 side, and the advanced control for lowering the exhaust gas recirculation temperature is performed by controlling the opening degree of the bypass valve 90 to the exhaust gas recirculation cooling device 74 side.

On the other hand, if the road changes from a flat road to an upward slope, a high output is demanded for the engine, and therefore it is preferable that the supercharging pressure is raised. In this case, in the example which is shown in FIG. 13A, if the movable vanes 93 are made to pivot from the position shown by the broken lines toward the position shown by the solid lines in FIG. 13A, the opening degree of the nozzle which is formed between the movable vanes 93 is made to decrease and the exhaust gas which passes through the nozzle and flows into the turbine rotor 92 becomes faster. As a result, the dynamic pressure which the inflowing exhaust gas gives to the turbine rotor 92 increases and the rotational speed of the turbine rotor 92 increases, so the supercharging pressure is raised. On the other hand, in the example which is shown in FIG. 13B, if the feed power to the electric motor 96 is increased, the rotational speed of the intake compressor 68a increases, so the supercharging pressure is raised.

However, in the example which is shown in FIG. 13A, time is required for the supercharging pressure to rise by making the opening degree of the nozzle formed between the movable vanes 93 decrease. In the example which is shown in FIG. 13B, time is required for the supercharging pressure to rise by making the feed power to the electric motor 96 increase. Therefore, in an embodiment of the present invention, before the road changes from a flat road to an upward slope and the load of the engine starts to increase, in the example which is shown in FIG. 13A, the opening degree of the nozzle formed between the movable vanes 93 is made to decrease and, in the example which is shown in FIG. 13B, the feed power to the electric motor 96 is made to increase. In this case, in the example which is shown in FIG. 13A, the engine operation control device which is controlled in advance is the variable nozzle type exhaust turbine 68b, and the control command value of the engine operation control device which is controlled in advance is the opening degree of the nozzle formed between the movable vanes 93. On the other hand, in the example which is shown in FIG. 13B, the engine operation control device which is controlled in advance is an electric turbocharger, and the control command value of the engine operation control device which is controlled in advance is the feed power to the electric motor 96.

FIG. 25 shows the case where it is predicted that the road will change from a flat road to an upward slope, so at the time t=0, in the example which is shown in FIG. 13A, the opening degree of the nozzle formed between the movable vanes 93 is made to decrease, while on the other hand, in the example which is shown in FIG. 13B, the feed power to the electric motor 96 is made to increase, and, after that, the demand for sudden stop DS of the vehicle is issued before the road changes from a flat road to an upward slope. In this case, in an embodiment of the present invention, as shown in FIG. 25, as soon as the demand for sudden stop DS of the vehicle is used, in the example which is shown in FIG. 13A, the opening degree of the nozzle formed between the movable vanes 93 is increased whereby the supercharging pressure is made to fall, while in the example which is shown in FIG. 13B, the feed power to the electric motor 96 is decreased whereby the supercharging pressure is made to fall. That is, the advanced control for increasing the supercharging pressure where the supercharging pressure is made to increase in advance is stopped. If the advanced control for increasing the supercharging pressure where the supercharging pressure is made to increase in advance is stopped in this way, it is possible to prevent an increase in the fuel consumption due to an unnecessary increase in output of the engine. Note that, the opening degree of the nozzle which is formed between the movable vanes 93 when the advanced control for increasing the supercharging pressure where the supercharging pressure is made to increase in advance is stopped is made to increase until a target opening degree corresponding to the operating state of the engine, and the feed power to the electric motor 96 is made to decrease to a target electric power corresponding to the operating state of the engine.

In this way, in the embodiment which is shown in FIG. 25, the engine operation control device is comprised of a supercharging pressure control device which controls a supercharging pressure. When it is predicted from the driving plan that the load of the engine will rise, the advanced control for increasing the supercharging pressure where the supercharging pressure is made to increase is started before the load of the engine rises, and, when there is the demand for sudden stop of the vehicle, the advanced control for increasing the supercharging pressure is stopped. In this case, in the example which is shown in FIG. 13A, the supercharging pressure control device is comprised of the variable nozzle type exhaust turbocharger 68b, the control command value is the opening degree of the nozzle of the variable nozzle type exhaust turbine 68b, and the advanced control for increasing the supercharging pressure is performed by controlling the opening degree of the nozzle of the variable nozzle type exhaust turbine 68b. On the other hand, in the example which is shown in FIG. 13B, the supercharging pressure control device is comprised of an electric power type intake compressor, the control command value is the feed power to the electric motor 96 for driving the intake compressor 68a, and the advanced control for increasing the supercharging pressure is performed by controlling the feed power to the electric motor 96.

FIG. 26 shows the case where it is predicted that the road will change to a downward slope at the time t=0, but, after that, before the road changes to a downward slope, for example, a pedestrian suddenly jumps out in front of the vehicle and causes the demand for sudden stop DS of the vehicle to be issued. In this case, since it is predicted that the load of the engine will start to decrease, at the time t=0 before reaching the time t=1, the opening degree of the bypass valve 90 to the EGR cooler 74 side is decreased in the example shown in FIG. 12, the opening degree of the nozzle formed between the movable vanes 93 is increased in the example shown in FIG. 13A, and the feed power to the electric motor 96 is decreased in the example shown in FIG. 13B.

Next, if the demand for sudden stop DS of the vehicle is issued, the engine load is made to rapidly fall. When the demand for sudden stop DS of the vehicle is issued in this way, if the opening degree of the bypass valve 90 to the EGR cooler 74 side is large, the amount of discharged PM will become greater, if the opening degree of the nozzle formed between the movable vanes 93 is small, the unnecessary increase in output of the engine will cause the fuel consumption to increase, and if the feed power to the electric motor 96 is large, the unnecessary increase in output of the engine will cause the fuel consumption to increase.

Therefore, in an embodiment of the present invention, when the demand for sudden stop DS of the vehicle is issued, in the example shown in FIG. 12, the opening degree of the bypass valve 90 to the EGR cooler 74 side is further decreased whereby the EGR gas temperature is further made higher, in the example shown in FIG. 13A, the opening degree of the nozzle formed between the movable vanes 93 is further increased whereby the supercharging pressure is further made to fall, and in the example shown in FIG. 13B, the feed power to the electric motor 96 is further decreased whereby the supercharging pressure is further made to fall. In this way, in an embodiment of the present invention, as soon as the demand for sudden stop DS of the vehicle is issued, the advanced control for increasing the EGR gas temperature where the EGR gas temperature is made to increase in advance is stopped and the advanced control for decreasing the supercharging pressure where the supercharging pressure is made to decrease in advance is stopped. Note that, when the advanced control for raising the EGR gas temperature where the EGR gas temperature is made to rise in advance is stopped, the opening degree of the bypass valve 90 to the EGR cooler 74 side is decreased to a target opening degree corresponding to the operating state of the engine, while when the advanced control for decreasing the supercharging pressure where the supercharging pressure is made to decrease in advance is stopped, the opening degree of the nozzle formed between the movable vanes 93 is increased up to a target opening degree corresponding to the operating state of the engine or the feed power to the electric motor 96 is decreased down to a target electric power corresponding to the operating state of the engine.

Note that, the control of the opening degree of the bypass valve 90 to the EGR cooler 74 side, the control of the opening degree of the nozzle formed between the movable vanes 93, and the control of the feed power to the electric motor 96 which are shown in FIG. 25 can be performed using the engine drive control routine which is shown in FIG. 22. The control of the opening degree of the bypass valve 90 to the EGR cooler 74 side, the control of the opening degree of the nozzle formed between the movable vanes 93, and the control of the feed power to the electric motor 96 which are shown in FIG. 26 can be performed using the engine drive control routine which is shown in FIG. 24. Therefore, the explanations of the engine drive control routine for performing the control which is shown in FIG. 25 and the engine drive control routine for performing the control which is shown in FIG. 26 will be omitted.

In this way, in the example which is shown in FIG. 12, the engine operation control device is comprised of a cooling water flow control device which controls the amount of flow of the cooling water of the exhaust gas recirculation cooling device 74 of the engine. When it is predicted from the driving plan that the load of the engine will fall, the advanced control for raising the exhaust gas recirculation temperature where the amount of flow of cooling water of the exhaust gas recirculation cooling device 74 is decreased is started before the load of the engine falls, and, when there is the demand for sudden stop of the vehicle, the advanced control for raising the exhaust gas recirculation temperature is stopped. In this case, the cooling water flow control device is comprised of the bypass valve 90 which controls the amount of engine cooling water fed from the inside of the engine body to the exhaust gas recirculation cooling device 74, the control command value is an opening degree of the bypass valve 90 to the exhaust gas recirculation cooling device 74 side, and the advanced control for raising the exhaust gas recirculation temperature is performed by controlling the opening degree of the bypass valve 90 to the exhaust gas recirculation cooling device 74 side.

On the other hand, in another example which is shown in FIG. 26, the engine operation control device is comprised of a supercharging pressure control device which controls the supercharging pressure. When it is predicted from the driving plan that the load of the engine will fall, the advanced control for decreasing the supercharging pressure where the supercharging pressure is made to decrease is started from before the load of the engine falls, and if there is the demand for sudden stop of the vehicle, the advanced control for decreasing the supercharging pressure is stopped. In this case, in the example which is shown in FIG. 13A, the supercharging pressure control device is comprised of the variable nozzle type of exhaust turbocharger 68, the control command value is the opening degree of the nozzle of the variable nozzle type exhaust turbine 68b, and the advanced control for decreasing the supercharging pressure is performed by controlling the opening degree of the nozzle of the variable nozzle type exhaust turbine 68b. On the other hand, in the example which is shown in FIG. 13B, the supercharging pressure control device is comprised of an electric power type intake compressor, the control command value is the feed power to the electric motor 96 for driving the intake compressor 68a, and the advanced control for decreasing the supercharging pressure is performed by controlling the feed power to the electric motor 96.

The invention claimed is:
1. An automated driving system of a vehicle comprising:
a detection sensor for detecting information on surroundings of the vehicle and,
an electronic control unit configured to generate a driving plan for the vehicle along a predetermined target route based on map information and the information of the surroundings of the vehicle detected by the detection sensor, the electronic control unit is further configured to control an automated driving of the vehicle based on the generated driving plan for the vehicle, wherein said electronic control unit is configured to start an advanced control of a control command value of an engine operation control device when a change in the operating state of the engine is predicted from said driving plan, where the control command value of the engine operation control device is made to change in a direction which is based on and prior to a predicted operating state of the engine, and said electronic control unit is configured to stop said advanced control of a control command value when there is a demand for sudden stop of the vehicle contrary to the driving plan of the vehicle along the predetermined target route based on the information on the surroundings of the vehicle detected by the detection sensor.

2. The automated driving system of a vehicle as claimed in claim 1, wherein said demand for sudden stop of the vehicle is made to be issued when avoiding contact with an external moving obstacle which is detected by the detection sensor.

3. The automated driving system of a vehicle as claimed in claim 1, wherein said engine operation control device is comprised of a cooling water temperature control device for controlling a temperature of a cooling water of an engine, said electronic control unit is configured to start an advanced control for lowering water temperature where the temperature of the cooling water of the engine is made to fall before a load of the engine rises when it is predicted from said driving plan that a rise in the load of the engine will cause the temperature of the cooling water of the engine to exceed a predetermined target range, and said electronic control unit is configured to stop said advanced control for lowering water temperature when there is the demand for sudden stop of the vehicle.

4. The automated driving system of a vehicle as claimed in claim 3, wherein said cooling water temperature control device is comprised of a flow control valve which controls an amount of the engine cooling water fed from an inside of an engine body to a radiator, said control command value is an opening degree of the flow control valve, and said advanced control for lowering water temperature is performed by controlling the opening degree of the flow control valve.

5. The automated driving system of a vehicle as claimed in claim 3, wherein said cooling water temperature control device is comprised of an electric water pump which controls an amount of the engine cooling water fed from an inside of an engine body to a radiator, said control command value is an electric power fed to the electric water pump, and said advanced control for lowering water temperature is performed by controlling the electric power fed to the electric water pump.

6. The automated driving system of a vehicle as claimed in claim 1, wherein said engine operation control device is comprised of a cooling water temperature control device for controlling a temperature of a cooling water of an engine, said electronic control unit is configured to start an advanced control for raising water temperature where the temperature of the cooling water of the engine is made to rise before a load of the engine falls when it is predicted from said driving plan that a fall in the load of the engine will cause the temperature of the cooling water of the engine to become a predetermined target range or less, and said electronic control unit is configured to stop said advanced control for raising water temperature when there is the demand for sudden stop of the vehicle.

7. The automated driving system of a vehicle as claimed in claim 6, wherein said cooling water temperature control device is comprised of a flow control valve which controls an amount of the engine cooling water fed from an inside of an engine body to a radiator, said control command value is an opening degree of the flow control valve, and said advanced control for raising water temperature is performed by controlling the opening degree of the flow control valve.

8. The automated driving system of a vehicle as claimed in claim 6, wherein said cooling water temperature control device is comprised of an electric water pump which controls an amount of the engine cooling water fed from an inside of an engine body to a radiator, said control command value is an electric power fed to the electric water pump, and said advanced control for raising water temperature is performed by controlling the electric power fed to the electric water pump.

9. The automated driving system of a vehicle as claimed in claim 1, wherein said engine operation control device is comprised of an exhaust gas recirculation flow control device for controlling an amount of exhaust gas recirculation flow of the engine, said electronic control unit is configured to start an advanced control for increasing recirculation exhaust gas flow amount where the amount of the recirculation exhaust gas flow is made to increase before a load of the engine rises when it is predicted from said driving plan that the load of the engine will rise, and said electronic control unit is configured to stop said advanced control for increasing recirculation exhaust gas flow amount when there is the demand for sudden stop of the vehicle.

10. The automated driving system of a vehicle as claimed in claim 9, wherein said exhaust gas recirculation flow control device is comprised of an exhaust gas recirculation control valve arranged in an exhaust gas recirculation passage of the engine, said control command value is an opening degree of the exhaust gas recirculation control valve, and said advanced control for increasing recirculation exhaust gas flow amount is performed by controlling the opening degree of the exhaust gas recirculation control valve.

11. The automated driving system of a vehicle as claimed in claim 1, wherein said engine operation control device is a cooling water flow control device for controlling an amount of flow of cooling water of an exhaust gas recirculation cooling device of the engine, said electronic control unit is configured to start an advanced control for lowering exhaust gas recirculation temperature where the amount of flow of cooling water of the exhaust gas recirculation cooling device is made to increase before a load of the engine rises when it is predicted from said driving plan that the load of the engine will rise, and said electronic control unit is configured to stop said advanced control for lowering exhaust gas recirculation temperature when there is the demand for sudden stop of the vehicle.

12. The automated driving system of a vehicle as claimed in claim 11, wherein said cooling water flow control device is comprised of a bypass valve for controlling an amount of engine cooling water fed from an inside of an engine body to the exhaust gas recirculation cooling device, said control command value is an opening degree of the bypass valve to an exhaust gas recirculation cooling device side, and said advanced control for lowering exhaust gas recirculation temperature is performed by controlling the opening degree of the bypass valve to the exhaust gas recirculation cooling device side.

13. The automated driving system of a vehicle as claimed in claim 1, wherein said engine operation control device is comprised of a supercharging pressure control device for controlling a supercharging pressure, said electronic control unit is configured to start an advanced control for increasing the supercharging pressure where the supercharging pressure is made to increase before a load of the engine rises when it is predicted from said driving plan that the load of the engine will rise, and said electronic control unit is configured to stop said advanced control for increasing supercharging pressure when there is the demand for sudden stop of the vehicle.

14. The automated driving system of a vehicle as claimed in claim 13, wherein said supercharging pressure control device is comprised of a variable nozzle type exhaust turbocharger, said control command value is an opening degree of a nozzle of the variable nozzle type exhaust turbine, and said advanced control for increasing supercharging pressure is performed by controlling the opening degree of the nozzle of the variable nozzle type exhaust turbine.

15. The automated driving system of a vehicle as claimed in claim 13, wherein said supercharging pressure control device is comprised of an electric power type intake compressor, said control command value is an electric power fed to an electric motor which drives the intake compressor, and said advanced control for increasing supercharging pressure is performed by controlling the electric power fed to the electric motor.

* * * * *